United States Patent
Fan

(10) Patent No.: US 12,457,023 B2
(45) Date of Patent: Oct. 28, 2025

(54) CHANNEL INFORMATION DETERMINING METHOD AND APPARATUS

(71) Applicant: HUAWEI TECHNOLOGIES CO., LTD., Guangdong (CN)

(72) Inventor: Bo Fan, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 623 days.

(21) Appl. No.: 17/832,300

(22) Filed: Jun. 3, 2022

(65) Prior Publication Data

US 2022/0302969 A1    Sep. 22, 2022

Related U.S. Application Data

(63) Continuation of application No. PCT/CN2019/123815, filed on Dec. 6, 2019.

(51) Int. Cl.
*H04B 7/06* (2006.01)
*H04L 25/02* (2006.01)

(52) U.S. Cl.
CPC ........... *H04B 7/063* (2013.01); *H04B 7/0626* (2013.01); *H04B 7/0632* (2013.01); *H04L 25/0224* (2013.01)

(58) Field of Classification Search
None
See application file for complete search history.

(56) References Cited

U.S. PATENT DOCUMENTS

2009/0163142 A1* 6/2009 Pi ............................ H04W 24/10
 455/62
2015/0373736 A1* 12/2015 Ji ............................ H04L 5/0048
 370/330

(Continued)

FOREIGN PATENT DOCUMENTS

CN 107733481 A 2/2018
CN 108631837 A 10/2018

(Continued)

OTHER PUBLICATIONS

Alcatel-Lucent, "Comparison of CSI Feedback Schemes," 3GPP TSG-RAN WG1 #58, R1-093343, Shenzhen, China, Aug. 24-28, 2009, 12 pages.

(Continued)

*Primary Examiner* — Andre Tacdiran
(74) *Attorney, Agent, or Firm* — Fish & Richardson P.C.

(57) ABSTRACT

Example channel information determining methods and apparatus are provided. One example method includes: after determining first channel information between a terminal device and a network device based on a downlink reference signal from the network device, the terminal device may determine feedback information based on the first channel information, and send the feedback information to the network device. The feedback information includes difference information between second channel information and third channel information, the second channel information is channel information that is in the first channel information and that corresponds to P antennas in M antennas of the terminal device, and the third channel information is channel information that is in the first channel information and that corresponds to M-P antennas in the M antennas.

10 Claims, 5 Drawing Sheets

(56) References Cited

U.S. PATENT DOCUMENTS

2016/0315683 A1 10/2016 Liu et al.
2017/0302353 A1* 10/2017 Rahman ............... H04B 7/0478
2020/0044803 A1 2/2020 Li et al.
2022/0149914 A1* 5/2022 Hindy .................... H04L 1/003

FOREIGN PATENT DOCUMENTS

| KR | 101635546 B1 | 7/2016 |
|----|--------------|--------|
| WO | 2018171727 A1 | 9/2018 |
| WO | 2020147033 A1 | 7/2020 |

OTHER PUBLICATIONS

Extended European Search Report issued in European Application No. 19955171.4 on Oct. 10, 2022, 12 pages.
Samsung, "On the Design and Performance Evaluation of Differential Codebooks," 3GPP TSG RAN WG1 Meeting #60bis, R1-102205, Beijing, China, Mar. 12-16, 2010, 14 pages.
3GPP TS 38.211 V15.0.0 (Dec. 2017), "3rd Generation Partnership Project; Technical Specification Group Radio Access Network; NR; Physical channels and modulation (Release 15)," Dec. 2017, 73 pages.
3GPP TS 38.212 V15.0.0 (Dec. 2017), "3rd Generation Partnership Project; Technical Specification Group Radio Access Network; NR; Multiplexing and channel coding (Release 15)," Dec. 2017, 82 pages.
3GPP TS 38.213 V15.0.0 (Dec. 2017), "3rd Generation Partnership Project; Technical Specification Group Radio Access Network; NR; Physical layer procedures for control (Release 15)," Dec. 2017, 56 pages.
3GPP TS 38.214 v15.0.0 (Dec. 2017), "3rd Generation Partnership Project; Technical Specification Group Radio Access Network; NR; Physical layer procedures for data (Release 15), " Dec. 2017, 71 pages.
3GPP TS 38.331 V15.3.0 (Sep. 2018), "3rd Generation Partnership Project; Technical Specification Group Radio Access Network;NR-;Radio Resource Control (RRC) protocol specification(Release 15)," Sep. 2018, 445 pages.
PCT International Search Report and Written Opinion issued in International Application No. PCT/CN2019/123815 on Aug. 31, 2020, 15 pages (with English translation).

* cited by examiner

CHANNEL INFORMATION DETERMINING METHOD AND APPARATUS

CROSS-REFERENCE TO RELATED APPLICATIONS

This application is a continuation of International Application No. PCT/CN2019/123815, filed on Dec. 6, 2019, the disclosure of which is hereby incorporated by reference in its entirety.

TECHNICAL FIELD

This application relates to the field of wireless communication technologies, and in particular, to a channel information determining method and an apparatus.

BACKGROUND

In a mobile communication system, a network device needs to obtain channel information between a terminal device and the network device, to schedule a resource for performing downlink data transmission. Mobile communication systems are usually classified into a time division duplex (TDD) system and a frequency division duplex (FDD) system. In the TDD system, a same frequency is used for uplink and downlink transmission, and uplink and downlink channels usually have reciprocity, that is, a downlink channel matrix and an uplink channel matrix are in a transposition relationship. During downlink data transmission, the network device needs to determine a corresponding transmission parameter, for example, a resource scheduling manner and a modulation and coding scheme, based on downlink channel information.

In the TDD system, based on the reciprocity between the uplink and downlink channels, the network device may obtain the downlink channel information by measuring a sounding reference signal (SRS) sent by the terminal device. However, in the TDD system, a part of terminal devices have limited capabilities, and cannot send SRSs through all antennas, but can send SRSs through only a part of antennas (for example, a single antenna). Consequently, the network device cannot obtain complete downlink channel information, and the network device cannot determine, based on the downlink channel information, the resource scheduling manner, the modulation and coding scheme, and the like during downlink transmission. This reduces downlink transmission performance.

SUMMARY

An objective of implementations of this application is to provide a channel information determining method and an apparatus, to resolve a problem of how a network device obtains complete channel information.

According to a first aspect, this application provides a channel information determining method. The method includes: A terminal device determines first channel information between the terminal device and a network device based on a downlink reference signal from the network device, and the terminal device determines feedback information based on the first channel information, and sends the feedback information to the network device, where the feedback information includes identifiers of K spatial channel components and channel differential information corresponding to each of the identifiers of the K spatial channel components, and K is an integer greater than or equal to 1; and K pieces of channel differential information corresponding to the identifiers of the K spatial channel components are difference information between second channel information and third channel information, the second channel information is channel information that is in the first channel information and that corresponds to P antennas in M antennas of the terminal device, the third channel information is channel information that is in the first channel information and that corresponds to M-P antennas in the M antennas, the M-P antennas are antennas in the M antennas except the P antennas, M is an integer greater than P, and P is an integer greater than 0.

In the foregoing method, the terminal device does not need to feed back complete channel information, and may feed back the difference information with low measurement and reporting overheads, so that the network device obtains the complete channel information. This improves uplink and downlink data transmission performance.

In a possible implementation, the channel differential information corresponding to each of the identifiers of the K spatial channel components is channel differential information between channel information corresponding to at least one of the P antennas and channel information corresponding to at least one of the M-P antennas.

In a possible implementation, channel differential information between channel information corresponding to a first antenna and channel information corresponding to a second antenna includes one or more of the following: an amplitude ratio or an amplitude difference, indicating a ratio or a difference between a signal amplitude in the channel information corresponding to the first antenna and a signal amplitude in the channel information corresponding to the second antenna;

a phase difference, indicating a difference between a signal phase in the channel information corresponding to the first antenna and a signal phase in the channel information corresponding to the second antenna; and
a delay difference, indicating a difference between a signal delay in the channel information corresponding to the first antenna and a signal delay in the channel information corresponding to the second antenna, where the first antenna is any one of the P antennas, and the second antenna is any one of the M-P antennas.

In a possible implementation, when the channel differential information includes the amplitude ratio, the feedback information further includes amplitude flipping indication information corresponding to the amplitude ratio; and when the amplitude flipping indication information is a first state value, the amplitude flipping indication information is used to indicate that the amplitude ratio is the ratio between the signal amplitude in the channel information corresponding to the first antenna and the signal amplitude in the channel information corresponding to the second antenna; or when the amplitude flipping indication information is a second state value, the amplitude flipping indication information is used to indicate that the amplitude ratio is a reciprocal of the ratio between the signal amplitude in the channel information corresponding to the first antenna and the signal amplitude in the channel information corresponding to the second antenna.

In a possible implementation, the feedback information further includes one or both of the following: a spatial channel component quantity, indicating a quantity of spatial channel components corresponding to the feedback information reported by the terminal device; and a time offset between the terminal device and the network device.

According to a second aspect, this application further provides a communication apparatus. The communication apparatus has a function of implementing any method provided in the first aspect. The communication apparatus may be implemented by hardware, or may be implemented by hardware by executing corresponding software. The hardware or software includes one or more units or units corresponding to the foregoing function.

In a possible implementation, the communication apparatus includes a processor, and the processor is configured to support the communication apparatus to perform a corresponding function of the terminal device in the foregoing method. The communication apparatus may further include a memory, and the memory may be coupled to the processor, and stores program instructions and data that are necessary for the communication apparatus. Optionally, the communication apparatus further includes a communication interface, and the communication interface is configured to support communication between the communication apparatus and a device such as a network device.

In a possible implementation, the communication apparatus includes corresponding functional units, respectively configured to implement the steps in the foregoing method. The function may be implemented by using hardware, or may be implemented by hardware executing corresponding software. The hardware or the software includes one or more units corresponding to the foregoing function.

In a possible implementation, a structure of the communication apparatus includes a processing unit and a communication unit. These units may perform corresponding functions in the foregoing method example. For details, refer to descriptions in the method provided in the first aspect. Details are not described herein again.

According to a third aspect, this application provides a channel information determining method. The method includes: A network device measures uplink reference signals from P antennas of a terminal device, to obtain fourth channel information, where the fourth channel information is channel information corresponding to the P antennas, and P is an integer greater than 0; the network device receives feedback information from the terminal device; and the network device determines fifth channel information between the network device and the terminal device based on the fourth channel information and the feedback information, where the feedback information includes identifiers of K spatial channel components and channel differential information corresponding to each of the identifiers of the K spatial channel components, and K is an integer greater than or equal to 1; and K pieces of channel differential information corresponding to the identifiers of the K spatial channel components are difference information between second channel information and third channel information, the second channel information is channel information that is in first channel information and that corresponds to the P antennas in M antennas of the terminal device, the third channel information is channel information that is in the first channel information and that corresponds to M-P antennas in the M antennas, the first channel information is channel information between all antennas of the terminal device and all antennas of the network device, the M-P antennas are antennas in the M antennas except the P antennas, and M is an integer greater than P.

In the foregoing method, when the terminal device sends the uplink reference signal through a part of antennas, the network device may determine complete channel information of a channel between the network device and the terminal device by using the fed-back difference information in the feedback information that is sent by the terminal device. This improves uplink and downlink data transmission performance.

In a possible implementation, the channel differential information corresponding to each of the identifiers of the K spatial channel components is channel differential information between channel information corresponding to at least one of the P antennas and channel information corresponding to at least one of the M-P antennas.

In a possible implementation, channel differential information between channel information corresponding to a first antenna and channel information corresponding to a second antenna includes one or more of the following:

an amplitude ratio or an amplitude difference, indicating a ratio or a difference between a signal amplitude in the channel information corresponding to the first antenna and a signal amplitude in the channel information corresponding to the second antenna;

a phase difference, indicating a difference between a signal phase in the channel information corresponding to the first antenna and a signal phase in the channel information corresponding to the second antenna; and a delay difference, indicating a difference between a signal delay in the channel information corresponding to the first antenna and a signal delay in the channel information corresponding to the second antenna, where the first antenna is any one of the P antennas, and the second antenna is any one of the M-P antennas.

In a possible implementation, when the channel differential information includes the amplitude ratio, the feedback information further includes amplitude flipping indication information corresponding to the amplitude ratio, and when the amplitude flipping indication information is a first state value, the amplitude flipping indication information is used to indicate that the amplitude ratio is the ratio between the signal amplitude in the channel information corresponding to the first antenna and the signal amplitude in the channel information corresponding to the second antenna; or when the amplitude flipping indication information is a second state value, the amplitude flipping indication information is used to indicate that the amplitude ratio is a reciprocal of the ratio between the signal amplitude in the channel information corresponding to the first antenna and the signal amplitude in the channel information corresponding to the second antenna.

In a possible implementation, the feedback information further includes one or both of the following:

a spatial channel component quantity, indicating a quantity of spatial channel components corresponding to the feedback information reported by the terminal device; and a time offset between the terminal device and the network device.

According to a fourth aspect, this application further provides a communication apparatus. The communication apparatus has a function of implementing any method provided in the third aspect. The communication apparatus may be implemented by hardware, or may be implemented by hardware by executing corresponding software. The hardware or software includes one or more units or units corresponding to the foregoing function.

In a possible implementation, the communication apparatus includes a processor, and the processor is configured to support the communication apparatus to perform a corresponding function of the network device in the foregoing method. The communication apparatus may further include a memory, and the memory may be coupled to the processor, and stores program instructions and data that are necessary for the communication apparatus. Optionally, the communication apparatus further includes a communication interface, and the communication interface is configured to support communication between the communication apparatus and a device such as a network device.

In a possible implementation, the communication apparatus includes corresponding functional units, respectively configured to implement the steps in the foregoing method. The function may be implemented by using hardware, or may be implemented by hardware executing corresponding software. The hardware or the software includes one or more units corresponding to the foregoing function.

In a possible implementation, a structure of the communication apparatus includes a processing unit and a communication unit. These units may perform corresponding functions in the foregoing method example. For details, refer to descriptions in the method provided in the first aspect. Details are not described herein again.

According to a fifth aspect, this application provides a channel information determining method. The method includes: A terminal device determines channel information between N antennas of a network device and M antennas of the terminal device based on a downlink reference signal from the network device; and the terminal device sends feedback information to the network device based on the channel information between the N antennas and the M antennas, where the feedback information is used to indicate difference information between second information and third information, the second information is channel information that is between the N antennas and P antennas and that is determined by the terminal device, the third information is channel information that is between the N antennas and M-P antennas of the terminal device and that is determined by the terminal device, the M-P antennas are antennas in the M antennas except the P antennas, N is an integer greater than 1, M is an integer greater than P, and P is an integer greater than 0.

In a possible implementation, the feedback information may specifically include: identifiers of K spatial channel components and channel differential information corresponding to each of the identifiers of the K spatial channel components, and K is an integer greater than or equal to 1; and channel differential information corresponding to an identifier of an $i^{th}$ spatial channel component in the identifiers of the K spatial channel components is channel differential information between channel information corresponding to at least one of the P antennas and channel information corresponding to at least one of the M-P antennas.

In a possible implementation, the channel information may further include one or more of the following: a signal amplitude, a signal phase, and a signal delay. Specifically, for channel differential information between channel information corresponding to a first antenna and channel information corresponding to a second antenna (where the first antenna is any one of the P antennas, and the second antenna is any one of the M-P antennas), for example, one or more of the following may be included:

an amplitude ratio or an amplitude difference, indicating a ratio or a difference between a signal amplitude in the channel information corresponding to the first antenna and a signal amplitude in the channel information corresponding to the second antenna;

a phase difference, indicating a difference between a signal phase in the channel information corresponding to the first antenna and a signal phase in the channel information corresponding to the second antenna; and a delay difference, indicating a difference between a signal delay in the channel information corresponding to the first antenna and a signal delay in the channel information corresponding to the second antenna.

In a possible implementation, when the channel differential information includes the amplitude ratio, the feedback information may further include amplitude flipping indication information corresponding to the amplitude ratio; and when the amplitude flipping indication information is a first state value, the amplitude flipping indication information is used to indicate that the amplitude ratio is the ratio between the signal amplitude in the channel information corresponding to the first antenna and the signal amplitude in the channel information corresponding to the second antenna; or when the amplitude flipping indication information is a second state value, the amplitude flipping indication information is used to indicate that the amplitude ratio is a reciprocal of the ratio between the signal amplitude in the channel information corresponding to the first antenna and the signal amplitude in the channel information corresponding to the second antenna.

In a possible implementation, the feedback information further includes one or both of the following: a spatial channel component quantity, indicating a quantity of spatial channel components corresponding to the feedback information reported by the terminal device; and a time offset between the terminal device and the network device.

According to a sixth aspect, this application further provides a communication apparatus. The communication apparatus has a function of implementing any method provided in the fifth aspect. The communication apparatus may be implemented by hardware, or may be implemented by hardware by executing corresponding software. The hardware or software includes one or more units or units corresponding to the foregoing function.

In a possible implementation, the communication apparatus includes a processor, and the processor is configured to support the communication apparatus to perform a corresponding function of the terminal device in the foregoing method. The communication apparatus may further include a memory, and the memory may be coupled to the processor, and stores program instructions and data that are necessary for the communication apparatus. Optionally, the communication apparatus further includes a communication interface, and the communication interface is configured to support communication between the communication apparatus and a device such as a network device.

In a possible implementation, the communication apparatus includes corresponding functional units, respectively configured to implement the steps in the foregoing method. The function may be implemented by using hardware, or may be implemented by hardware executing corresponding software. The hardware or the software includes one or more units corresponding to the foregoing function.

In a possible implementation, a structure of the communication apparatus includes a processing unit and a communication unit. These units may perform corresponding functions in the foregoing method example. For details, refer to descriptions in the method provided in the first aspect. Details are not described herein again.

According to a seventh aspect, this application provides a channel information determining method. The method includes: A network device measures uplink reference signals from a terminal device through N antennas, to obtain first information, where the uplink reference signals are sent through P antennas in M antennas of the terminal device, the first information is channel information between the N antennas and the P antennas, N is an integer greater than 1, M is an integer greater than P, and P is an integer greater than 0; the network device receives feedback information from the terminal device, where the feedback information is used to indicate difference information between second information and third information, the second information is channel information that is between the N antennas and the P antennas and that is determined by the terminal device, the third information is channel information that is between the N antennas and M-P antennas of the terminal device and that is determined by the terminal device, and the M-P antennas are antennas in the M antennas except the P antennas; and the network device determines channel information between the N antennas and the M antennas based on the first information and the feedback information.

In a possible implementation, the feedback information may specifically include: identifiers of K spatial channel components and channel differential information corresponding to each of the identifiers of the K spatial channel components, and K is an integer greater than or equal to 1; and channel differential information corresponding to an identifier of an $i^{th}$ spatial channel component in the identifiers of the K spatial channel components is channel differential information between channel information corresponding to at least one of the P antennas and channel information corresponding to at least one of the M-P antennas.

In a possible implementation, the channel information may further include one or more of the following: a signal amplitude, a signal phase, and a signal delay. Specifically, for channel differential information between channel information corresponding to a first antenna and channel information corresponding to a second antenna (where the first antenna is any one of the P antennas, and the second antenna is any one of the M-P antennas), for example, one or more of the following may be included:

an amplitude ratio or an amplitude difference, indicating a ratio or a difference between a signal amplitude in the channel information corresponding to the first antenna and a signal amplitude in the channel information corresponding to the second antenna;

a phase difference, indicating a difference between a signal phase in the channel information corresponding to the first antenna and a signal phase in the channel information corresponding to the second antenna; and a delay difference, indicating a difference between a signal delay in the channel information corresponding to the first antenna and a signal delay in the channel information corresponding to the second antenna.

In a possible implementation, when the channel differential information includes the amplitude ratio, the feedback information may further include amplitude flipping indication information corresponding to the amplitude ratio; and when the amplitude flipping indication information is a first state value, the amplitude flipping indication information is used to indicate that the amplitude ratio is the ratio between the signal amplitude in the channel information corresponding to the first antenna and the signal amplitude in the channel information corresponding to the second antenna; or when the amplitude flipping indication information is a second state value, the amplitude flipping indication information is used to indicate that the amplitude ratio is a reciprocal of the ratio between the signal amplitude in the channel information corresponding to the first antenna and the signal amplitude in the channel information corresponding to the second antenna.

In a possible implementation, the feedback information further includes one or both of the following: a spatial channel component quantity, indicating a quantity of spatial channel components corresponding to the feedback information reported by the terminal device; and a time offset between the terminal device and the network device.

According to an eighth aspect, this application further provides a communication apparatus. The communication apparatus has a function of implementing any method provided in the seventh aspect. The communication apparatus may be implemented by hardware, or may be implemented by hardware by executing corresponding software. The hardware or software includes one or more units or units corresponding to the foregoing function.

In a possible implementation, the communication apparatus includes a processor, and the processor is configured to support the communication apparatus to perform a corresponding function of the network device in the foregoing method. The communication apparatus may further include a memory, and the memory may be coupled to the processor, and stores program instructions and data that are necessary for the communication apparatus. Optionally, the communication apparatus further includes a communication interface, and the communication interface is configured to support communication between the communication apparatus and a device such as a network device.

In a possible implementation, the communication apparatus includes corresponding functional units, respectively configured to implement the steps in the foregoing method. The function may be implemented by using hardware, or may be implemented by hardware executing corresponding software. The hardware or the software includes one or more units corresponding to the foregoing function.

In a possible implementation, a structure of the communication apparatus includes a processing unit and a communication unit. These units may perform corresponding functions in the foregoing method example. For details, refer to descriptions in the method provided in the first aspect. Details are not described herein again.

According to a ninth aspect, this application provides a communication apparatus. The communication apparatus includes a processor; and when the processor executes a computer program or instructions in a memory, the method according to the first aspect, the third aspect, the fifth aspect, or the seventh aspect is performed.

According to a tenth aspect, this application provides a communication apparatus. The communication apparatus includes a processor and a memory. The memory is configured to store a computer program or instructions. The processor is configured to execute the computer program or the instructions stored in the memory, so that the communication apparatus performs the corresponding method according to the first aspect, the third aspect, the fifth aspect, or the seventh aspect.

According to an eleventh aspect, this application provides a communication apparatus. The communication apparatus includes a processor, a memory, and a transceiver. The transceiver is configured to receive a signal or send a signal. The memory is configured to store a computer program or instructions. The processor is configured to invoke the computer program or the instructions from the memory, to perform the method according to the first aspect, the third aspect, the fifth aspect, or the seventh aspect.

According to a twelfth aspect, this application provides a communication apparatus. The communication apparatus includes a processor and an interface circuit. The interface circuit is configured to receive code instructions and transmit the code instructions to the processor. The processor runs the code instructions to perform the corresponding method according to the first aspect, the third aspect, the fifth aspect, or the seventh aspect.

According to a thirteenth aspect, this application provides a computer-readable storage medium. The computer-readable storage medium is configured to store a computer program or instructions. When a computer reads and executes the computer program or the instructions, the method according to the first aspect, the third aspect, the fifth aspect, or the seventh aspect is implemented.

According to a fourteenth aspect, this application provides a computer program product including instructions. When a computer reads and executes the computer program product, the method according to the first aspect, the third aspect, the fifth aspect, or the seventh aspect is implemented.

According to a fifteenth aspect, this application provides a chip. The chip includes a processor. The processor is coupled to a memory, and is configured to execute a computer program or instructions stored in the memory. When the processor executes the computer program or the instructions, the method according to the first aspect, the third aspect, the fifth aspect, or the seventh aspect is implemented.

According to a sixteenth aspect, this application provides a system. The system includes the communication apparatus provided in the second aspect and the communication apparatus provided in the fourth aspect.

DESCRIPTION OF EMBODIMENTS

The following further describes in detail embodiments of this application with reference to the accompanying drawings.

Technical solutions in embodiments of this application may be applied to various communication systems using a TDD technology, for example, a global system for mobile communications (GSM) system, a code division multiple access (CDMA) system, a wideband code division multiple access (WCDMA) system, a general packet radio service (GPRS) system, an LTE TDD system, a 5th generation (5G) system, a new radio (NR) system, or the like. This is not limited herein.

Figure 1:
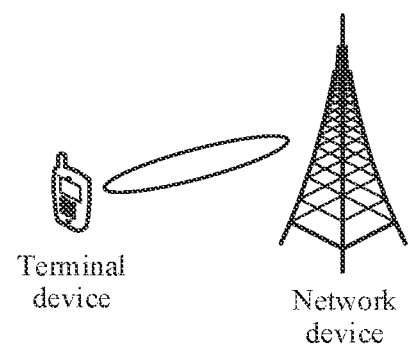
FIG. 1 is a schematic diagram of a network architecture to which an embodiment of this application is applicable.

For ease of understanding of embodiments of this application, a communication system shown in FIG. 1 is first used as an example to describe in detail a communication system to which embodiments of this application are applicable. FIG. 1 shows an architecture of a possible communication system to which a method according to an embodiment of this application is applicable. The architecture of the communication system includes a network device and at least one terminal device. The network device may establish a communication link to at least one terminal device (for example, a terminal device 1 and a terminal device 2 shown in the figure) through beams in different directions. The network device may provide a radio access related service for the at least one terminal device, to implement one or more of the following functions: a radio physical layer function, a resource scheduling and radio resource management function, a quality of service (QoS) management function, a radio access control function, and a mobility management function. Alternatively, the at least one terminal device may form a beam to perform data transmission with the network device. In this embodiment, the network device may communicate with the at least one terminal device through a beam.

It should be noted that the architecture of the communication system shown in FIG. 1 is not limited to including only the devices shown in the figure, and may further include another device not shown in the figure. Details are not described herein in this application one by one.

Figure 2:
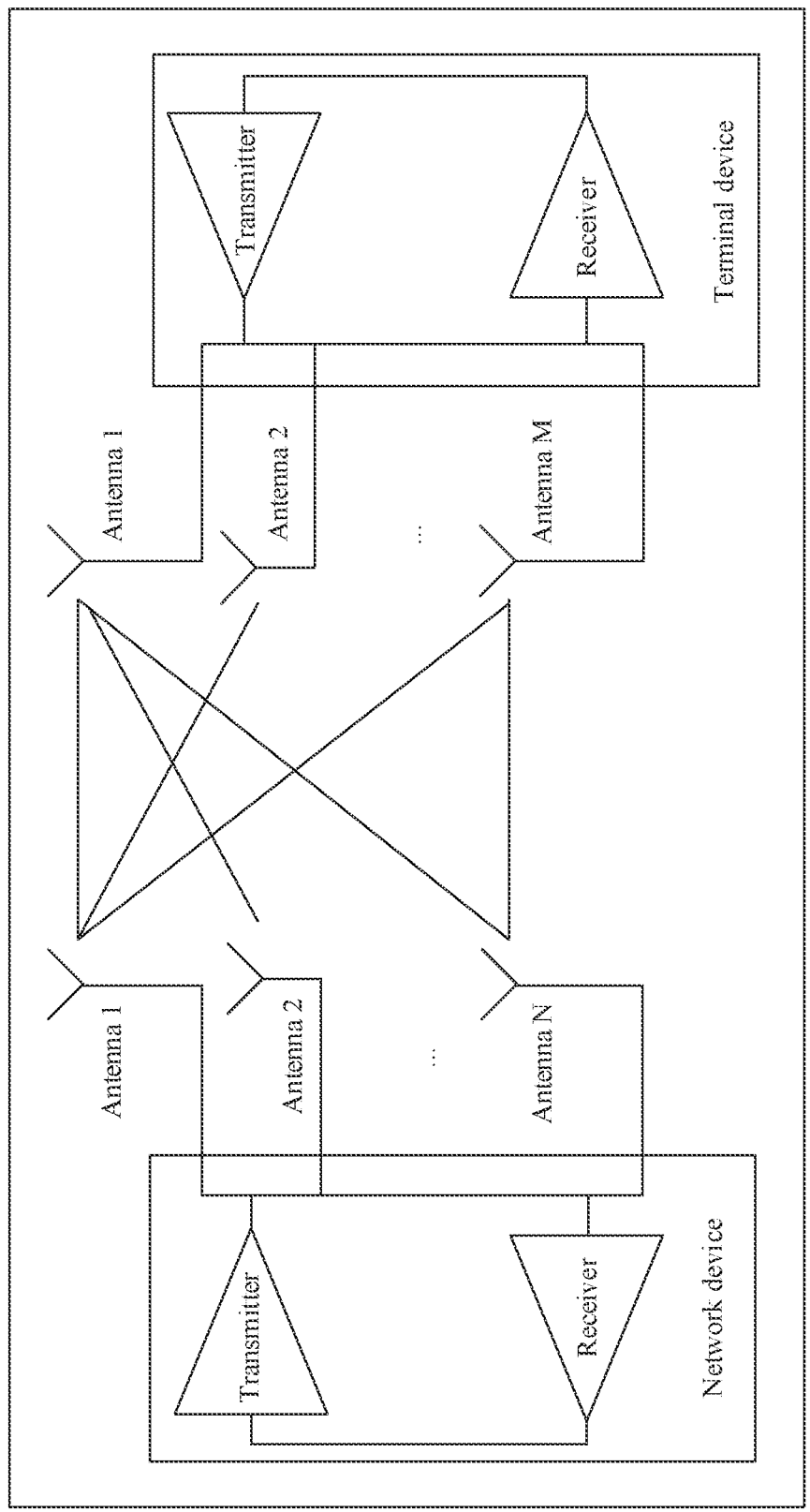
FIG. 2 is a schematic diagram of a correspondence between an antenna and channel information according to an embodiment of this application.

The network system shown in FIG. 1 may perform communication by using a TDD technology. In the TDD system, a same frequency is used for uplink and downlink transmission, and uplink and downlink channels usually have reciprocity, that is, a downlink channel matrix and an uplink channel matrix are in a transposition relationship. It is assumed that, as shown in FIG. 2, that the network device includes N antennas and the terminal device includes M antennas is used as an example. Channel information between the network device and the terminal device may be an M×N channel matrix. For example, the channel matrix H may satisfy the following form:

$$H = \begin{bmatrix} h_{1-1} & h_{1-2} & \cdots & h_{1-M} \\ h_{2-1} & h_{2-2} & \cdots & h_{2-M} \\ \cdots & \cdots & \cdots & \cdots \\ h_{M-1} & h_{M-2} & \cdots & h_{M-N} \end{bmatrix}_{M \times N} \quad (1)$$

$h_{i-j}$ represents channel information between an $i^{th}$ antenna of the terminal device and a $j^{th}$ antenna of the network device, a value range of i is $1 \leq i \leq M$, and a value range of j is $1 \leq j \leq N$.

It should be noted that, in this embodiment of this application, unless otherwise specified, the channel information between the antenna i of the terminal device and the antenna j of the network device is denoted as $h_{i-j}$ in the following descriptions. It can be learned from the foregoing channel matrix that complete channel information between the network device and the terminal device may include channel information between all antennas of the network device and all antennas of the terminal device.

In the TDD system, the network device may measure an uplink reference signal (for example, an SRS) sent by the terminal device, to obtain the channel information between the network device and the terminal device. However, due to a limited capability of the terminal device, the terminal device may not use all antennas to send the uplink reference signal, but can use only a part of antennas (for example, a single antenna) to send the uplink reference signal. In this case, the network device cannot obtain the complete channel information. Therefore, this application provides a method, so that the network device can obtain the channel information between the network device and the terminal device when the terminal device does not use all antennas to send the uplink reference signal. Details are described below.

Reference to "an embodiment", "some embodiments", or the like described in embodiments of this application means that one or more embodiments of this application include a specific feature, structure, or characteristic described with reference to embodiments. Therefore, statements such as "in an embodiment", "in some embodiments", "in some other embodiments", and "in other embodiments" that appear at different places in this specification do not necessarily mean referring to a same embodiment, instead, they mean "one or more but not all of the embodiments", unless otherwise specifically emphasized. The terms "include". "contain", "have", and their variants all mean "include but are not limited to", unless otherwise specifically emphasized.

In this application, "at least one" means one or more, and "a plurality of" means two or more. The term "and/or" describes an association relationship for describing associated objects and represents that three relationships may exist. For example, A and/or B may represent the following three cases: Only A exists, both A and B exist, and only B exists, where A and B may be singular or plural. The character "/" usually represents an "or" relationship between the associated objects. The term "at least one of the following items (pieces)" or a similar expression thereof means any combination of these items, including any combination of singular items (pieces) or plural items (pieces). For example, at least one (piece) of a, b, or c may represent: a, b, c, a and b, a and c, b and c, or a, b, and c, where a, b, and c may be singular or plural.

The terminal device in embodiments of this application may also be referred to as user equipment, an access terminal, a subscriber unit, a subscriber station, a mobile station, a remote station, a remote terminal, a mobile device, a user terminal, a terminal, a wireless communication device, a user agent, or a user apparatus. Alternatively, the terminal device may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a future 5G network, a terminal device in a future evolved public land mobile network (PLMN), or the like. This is not limited in embodiments of this application.

For example, the terminal device may include a radio resource control (RRC) signaling exchange module, a media access control (MAC) signaling exchange module, and a physical (PHY) signaling exchange module. The RRC signaling exchange module may be a module used by the network device and the terminal device to send and receive RRC signaling. The MAC signaling exchange module may be a module used by the network device and the terminal device to send and receive MAC control element (CE) signaling. The PHY signaling exchange module may be a module used by the network device and the terminal device to send and receive uplink control signaling or downlink control signaling, and uplink and downlink data or downlink data.

The network device in embodiments of this application may be a device configured to communicate with the terminal device. The network device may be a base transceiver station (BTS) in a GSM system or a CDMA system, or may be a NodeB (NB) in a WCDMA system, or may be an evolved NodeB (eNB or eNodeB) in an LTE system, or may be a radio controller in a cloud radio access network (CRAN) scenario. Alternatively, the network device may be a relay station, an access point, a vehicle-mounted device, a wearable device, an access network device (for example, a gNB) in a future 5G network, an access network device in a future evolved PLMN network, or the like. This is not limited in embodiments of this application.

For example, the network device may also include an RRC signaling exchange module, a MAC signaling exchange module, and a PHY signaling exchange module.

In some deployments, the network device may include a centralized unit (CU) and a distributed unit (DU). The network device may further include an active antenna unit (AAU). The CU implements some functions of the network device, and the DU implements some other functions of the network device. For example, the CU is responsible for processing a non-real-time protocol and service, and implements functions of an RRC layer and a packet data convergence protocol (PDCP) layer. The DU is responsible for processing a physical layer protocol and a real-time service, and implements functions of a radio link control (RLC) layer, a MAC layer, and a PHY layer. The AAU implements some physical layer processing functions, a radio frequency processing function, and a function related to an active antenna. Information at the RRC layer is eventually converted into information at the PHY layer, or is converted from information at the PHY layer. Therefore, in this architecture, higher layer signaling such as RRC layer signaling may also be considered as being sent by the DU or sent by the DU and the AAU. It may be understood that the network device may be a device including one or more of a CU node, a DU node, and an AAU node. In addition, the CU may be classified into a network device in a radio access network (RAN), or the CU may be classified into a network device in a core network (CN). This is not limited in this application.

A system architecture and a service scenario described in embodiments of this application are intended to describe the technical solutions in embodiments of this application more clearly, and do not constitute a limitation on the technical solutions provided in embodiments of this application. A person of ordinary skill in the art may learn that: With evolution of the network architecture and emergence of a new service scenario, the technical solutions provided in embodiments of this application are also applicable to similar technical problems.

In embodiments of this application, interaction between the terminal device and the network device is used as an example for description. The method provided in embodiments of this application may be further applicable to interaction between other execution bodies, for example, interaction between a chip or a module in the terminal device and a chip or a module in the network device. When the execution body is a chip or a module, refer to the descriptions in embodiments of this application. Details are not described herein again.

A main idea of this application is that: When the terminal device sends the uplink reference signal through only a part of antennas, the network device may measure the uplink reference signal sent by the terminal antenna through the part of antennas, to obtain a part of channel information of the channel. The terminal device measures, through all antennas, a downlink reference signal sent by the network device through all antennas, to obtain complete channel information of the channel. Then, the terminal device feeds back some information of the obtained complete channel information to the network device as difference information. The network device may determine the complete channel information based on the part of channel information obtained through measurement by the network device and the difference information. The difference information fed back by the terminal device may be difference information between channel information that is in the complete channel information and that corresponds to at least one of antennas used to send the uplink reference signal and channel information that is in the complete channel information and that corresponds to at least one of antennas not used to send the uplink reference signal.

Figure 3:
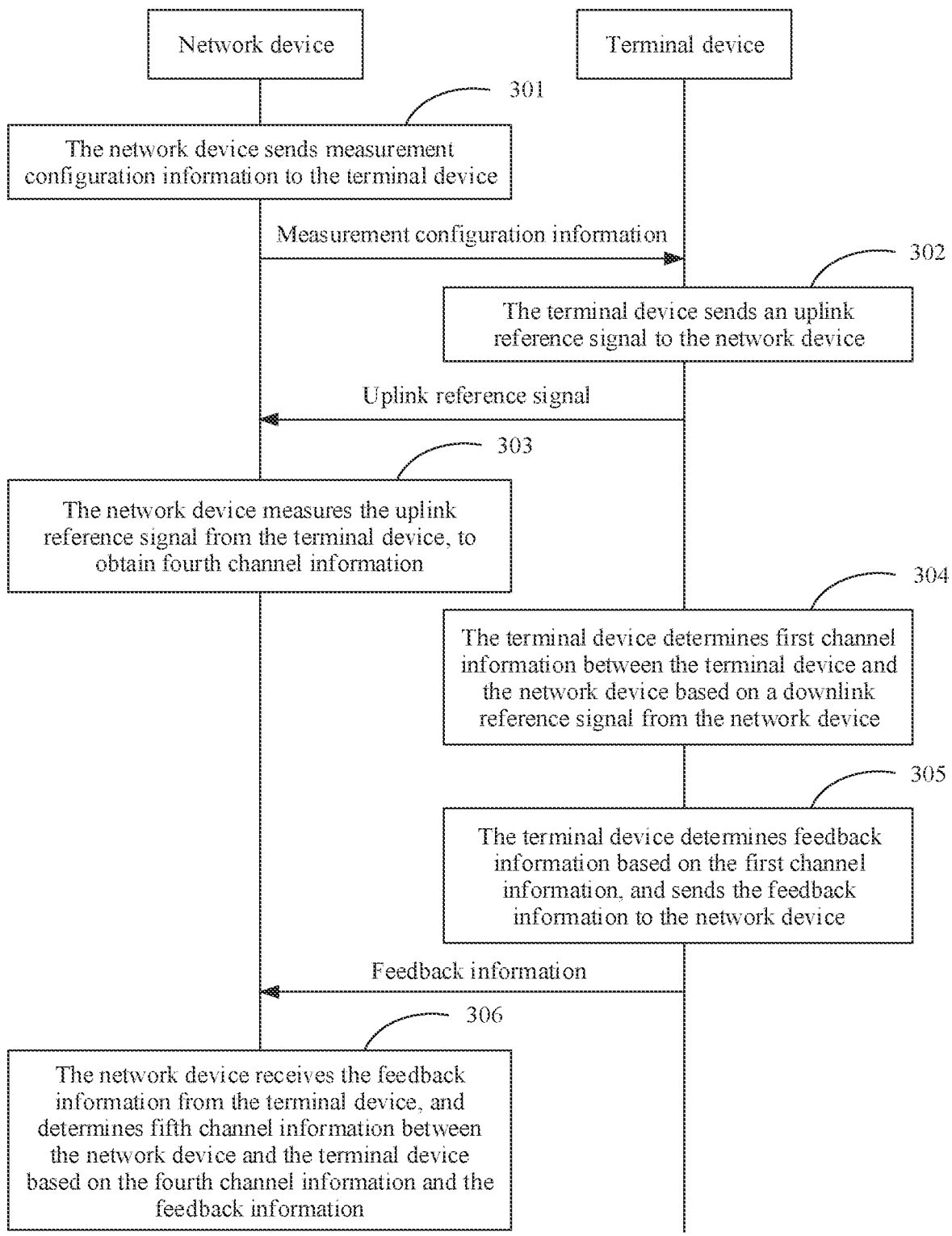
FIG. 3 is a schematic flowchart of a channel information determining method according to an embodiment of this application.

With reference to the foregoing descriptions, FIG. 3 is a schematic flowchart of a channel information determining method according to an embodiment of this application. A procedure of the method may be applied to a communication system using a TDD technology. In the procedure shown in FIG. 3, an example in which a network device includes N antennas and a terminal device includes M antennas is used for description. For another case, refer to descriptions in embodiments of this application. Details are not described herein. N is an integer greater than 1, and M is an integer greater than 1. Refer to FIG. 3. The method includes the following steps.

Step 301: The network device sends measurement configuration information to the terminal device.

The measurement configuration information may include measurement resource configuration information and measurement result reporting configuration information.

It should be noted that before the network device sends a downlink reference signal to the terminal device, the terminal device needs to determine specific resources on which the network device sends the downlink reference signal. Therefore, the network device may indicate, to the terminal device by using the measurement resource configuration information, related information of a resource carrying the downlink reference signal.

As described above, the measurement resource configuration information may include related information of a resource that needs to be measured by the terminal device, for example, a resource sending periodicity and a resource type. The resource type may include but is not limited to one or a combination of both of the following resources: a channel state information reference signal (CSI-RS) resource and a synchronization signal and PBCH block (SSB) resource.

After measuring the resource carrying the downlink reference signal, the terminal device may feed back a measurement result to the network device. The network device may indicate, by using the measurement result reporting configuration information, specific information reported by the terminal device.

For example, the measurement result reporting configuration information may include information such as a reporting periodicity and report content (for example: report Quantity). The report content may include one or more of the following: an index of a measured resource, an antenna index, an index of a spatial path/spatial channel component, a frequency subband index, channel differential information, and the like. The channel differential information refers to difference information between channels corresponding to different antennas.

Step 302: The terminal device sends an uplink reference signal to the network device.

The uplink reference signal may include but is not limited to a signal such as an SRS. The network device may measure the uplink reference signal sent by the terminal device, to obtain corresponding channel information based on a measurement result.

The terminal device may send the uplink reference signals through P antennas in the M antennas. P is an integer less than M and greater than 0.

In this step, the terminal device sends the uplink reference signal through only a part of antennas. Consequently, the network device cannot finally determine complete channel information. For example, it is assumed that N is equal to 2, and M is equal to 2. The terminal device sends an SRS to the network device through an antenna 1, and the network device receives the SRS through an antenna 1 and an antenna 2. The network device may obtain, by measuring the SRS sent by the terminal device, channel information $h_{1\text{-}1}$ between the antenna 1 of the terminal device and the antenna 1 of the network device, channel information $h_{1\text{-}2}$ between the antenna 1 of the terminal device and the antenna 2 of the network device, and channel information $h_{2\text{-}1}$ between an antenna 2 of the terminal device and the antenna 1 of the network device, and channel information $h_{2\text{-}2}$ between the antenna 2 of the terminal device and the antenna 2 of the network device is still unknown.

With reference to the foregoing descriptions, channel information $H_{DL}$ obtained by the network device through measurement may satisfy the following formula:

$$H_{DL} = \begin{bmatrix} h_{1\text{-}1} & h_{1\text{-}2} \\ NA & NA \end{bmatrix} \qquad (2)$$

NA indicates that the information is not obtained.

It should be noted that, in this embodiment of this application, unless otherwise specified, channel information between an antenna i of the terminal device and an antenna j of the network device is denoted as $h_{i\text{-}j}$ in the following descriptions. The complete channel information between the network device and the terminal device may include channel information between all antennas of the network device and all antennas of the terminal device.

Figure 4:
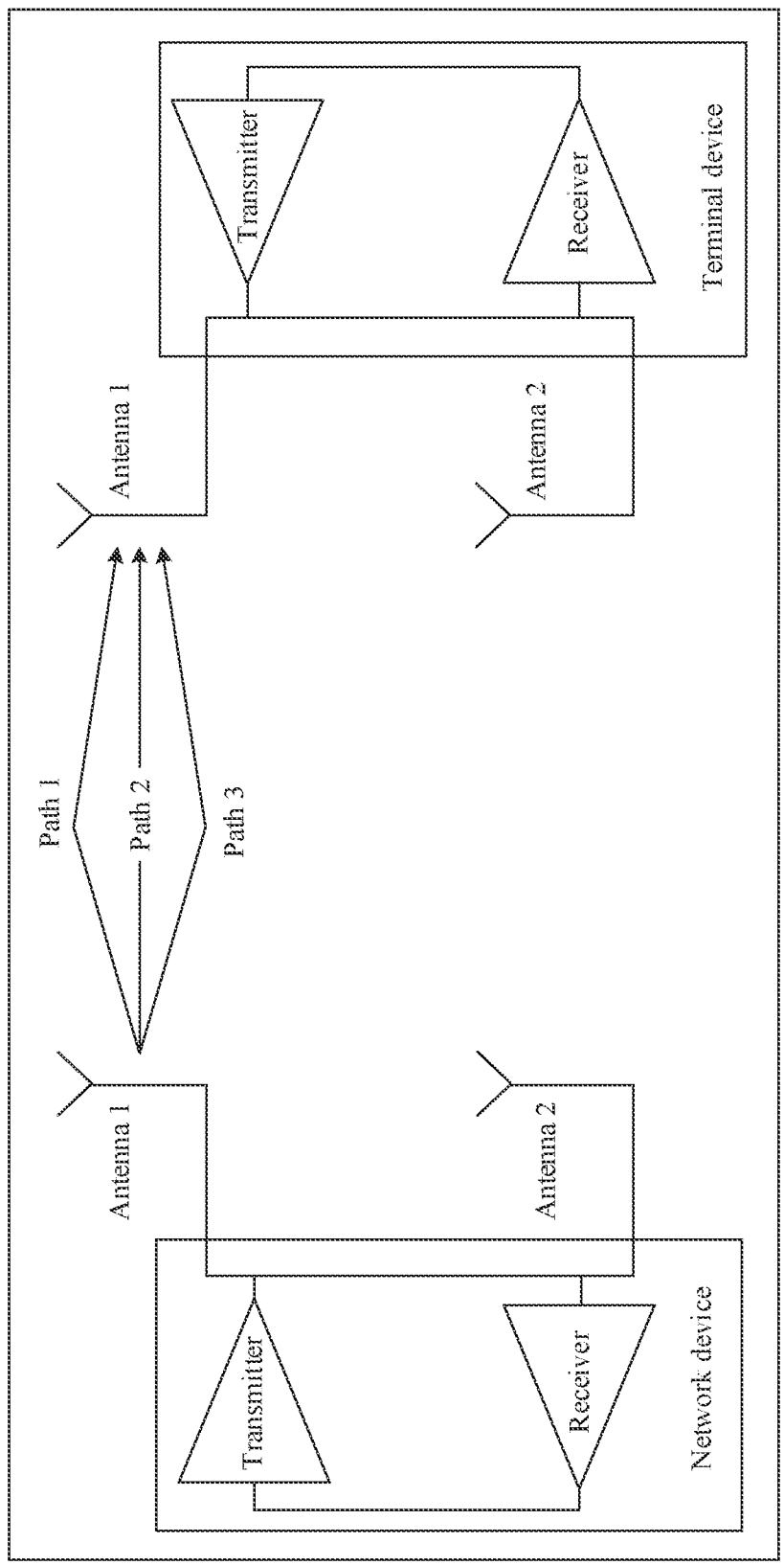
FIG. 4 is a schematic diagram of a correspondence between an antenna and channel information according to an embodiment of this application.

It should be noted that a channel between the network device and the terminal device includes one or more spatial paths. Signals from transmit antennas to receive antennas arrive at the receive antennas through a same group of spatial paths. For example, as shown in FIG. 4, assuming that the channel between the network device and the terminal device includes three spatial paths: a path 1, a path 2, and a path 3, $h_{1\text{-}1}$, $h_{1\text{-}2}$, $h_{2\text{-}1}$, and $h_{2\text{-}2}$ in the foregoing example all include the three spatial paths, $h_{1\text{-}1}$ is used as an example. An uplink reference signal sent by the antenna 1 of the terminal device to the antenna 1 of the network device arrives at the antenna 1 of the terminal device through the three spatial paths. The signal is subject to specific amplitude and phase deformation through each path, and this may be considered as impact of the spatial path on the signal, namely, a channel characteristic of the spatial path. Channel characteristics of all the paths are combined to obtain a channel characteristic of an entire channel between the antenna 1 of the terminal network device and the antenna 1 of the network device. Therefore, a channel characteristic on a spatial path may be considered as a spatial channel component, and channel information between two antennas is a combination of all spatial channel components.

With reference to the foregoing descriptions, assuming that spatial channel components between the antenna 1 of the terminal device and the antenna 1 of the network device are respectively $h_{1-1}^{(1)}$, $h_{1-1}^{(2)}$, $h_{1-1}^{(3)}$, $h_{1-1}$ may be expressed as: $h_{1-1} = h_{1-1}^{(1)} + h_{1-1}^{(2)} + h_{1-1}^{(3)}$. For another case, refer to the foregoing descriptions. Details are not described herein again.

Step 303: The network device measures the uplink reference signal from the terminal device, to obtain fourth channel information.

As described above, when the terminal device sends the uplink reference signals through the P antennas, the network device may determine channel information corresponding to the P antennas of the terminal device.

It should be noted that the channel information corresponding to the P antennas may be a sum of channel information between all of the P antennas of the terminal device and the N antennas of the network device. For example, P is equal to 1, and N is equal to 2. The terminal device sends the uplink reference signal through the antenna 1. In this case, the fourth channel information obtained by the network device, namely, the channel information corresponding to the P antennas, may include the channel information between the antenna 1 of the terminal device and the antenna 1 of the network device and the channel information between the antenna 1 of the terminal device and the antenna 2 of the network device.

For another example, the channel information between the network device and the terminal device may be an M×N channel matrix. When the terminal device sends the uplink reference signals through the P antennas, a channel matrix $H_P$ corresponding to the fourth channel information obtained by the network device may be expressed as follows:

$$H_P = \begin{bmatrix} h_{1-1} & h_{1-2} & \cdots & h_{1-M} \\ h_{2-1} & h_{2-2} & \cdots & h_{2-M} \\ \cdots & \cdots & \cdots & \cdots \\ h_{P-1} & h_{P-2} & \cdots & h_{P-M} \\ NA & NA & NA & NA \\ NA & NA & NA & NA \\ \cdots & \cdots & \cdots & \cdots \\ NA & NA & NA & NA \end{bmatrix}_{M \times N} \quad (3)$$

NA indicates that the corresponding channel information is not obtained. It can be learned from the foregoing formula (3) that, in the channel matrix corresponding to the fourth channel information, when a value range of i is P+1≤i≤M, and a value range of j is 1≤j≤N, the corresponding channel information $h_{i-j}$ is NA.

It should be noted that step 301 to step 303 are optional steps in this embodiment of this application. The foregoing steps are described herein only to describe an application scenario of this embodiment of this application, and do not represent a limitation on this embodiment of this application.

Step 304: The terminal device determines first channel information between the terminal device and the network device based on the downlink reference signal from the network device.

The downlink reference signal includes but is not limited to a signal such as an SSB or a CSI-RS.

It should be noted that, when the network device sends the downlink reference signal, all antennas of the network device may be used to send the downlink reference signal, so that the terminal device can determine the complete channel information between the terminal device and the network device, namely, the first channel information.

Step 305: The terminal device determines feedback information based on the first channel information, and sends the feedback information to the network device.

In this embodiment of this application, the feedback information may include the following content:
  identifiers of K spatial channel components, where K is an integer greater than or equal to 1; and
  channel differential information corresponding to each of the identifiers of the K spatial channel components.

Each of the identifiers of the K spatial channel components may correspond to one spatial channel component. As described above, a plurality of spatial channel components may be included between the terminal device and the network device. Therefore, the network device can determine, by using the identifier of the spatial channel component, a specific spatial channel component corresponding to each piece of channel differential information reported by the terminal device. The identifier of the spatial channel component may also be referred to as an identifier of a spatial path or an identifier of a time domain tap, and a specific name thereof is not limited in this application. Any name that has a same technical effect as that of the identifier of the spatial channel component in this application falls within the protection scope of this application. A value of K may be indicated by the network device to the terminal device, for example, sent to the terminal device by using RRC signaling, media access control-control element (MAC-CE) information, or downlink control information (DCI), or may be reported by terminal device, for example, reported to the network device by using a capability of the UE, or may be calculated according to a specific rule, for example, a value calculated based on a quantity of antennas/a quantity of antenna ports.

In this embodiment of this application, the identifier of the spatial channel component may be fed back in the following manners:

An identifier of the first spatial channel component in the identifiers of the K spatial channel components is fed back by using X bits, and the first spatial channel component in the identifiers of the K spatial channel components refers to a spatial channel component with a shortest delay or earliest time in spatial channel components that are to be reported. The X bits represent a delay corresponding to the spatial channel component or an identifier of a time domain tap corresponding to the spatial channel component. For example, if X=0 represents the first time domain tap. X=10 represents the eleventh time domain tap.

An identifier of the second spatial channel component in the identifiers of the K spatial channel components is fed back by using Y bits, where Y may be equal to X. The Y bits are also used to represent a delay corresponding to the spatial channel component or an identifier of a time domain tap corresponding to the spatial channel component. Y may alternatively be less than X. In this case, Y represents a difference between the delay corresponding to the spatial channel component and a delay corresponding to a previous spatial channel component/the first spatial channel component, an interval between the time domain tap corresponding to the spatial channel component and a time domain tap corresponding to the previous spatial channel component/the first spatial channel component, a difference between identifiers of time domain taps, or the like.

How to feed back an identifier of the third spatial channel component to an identifier of a $K^{th}$ spatial channel component in the identifiers of the K spatial channel components may be deduced by analogy, and details are not described herein again.

Values of X and Y may be indicated by the network device to the terminal device, for example, sent to the terminal device by using RRC signaling. MAC-CE information, or DCI, or may be reported by the terminal device, for example, reported to the network device by using a capability of the terminal device, or may be calculated according to a specific rule, for example, a value calculated based on a quantity of antennas/a quantity of antenna ports.

In this embodiment of this application, for each spatial channel component, channel differential information, corresponding to the spatial channel component, fed back by the terminal device may be channel differential information between channel information corresponding to the first part of antennas of the terminal device and channel information corresponding to antennas other than the first part of all the antennas of the terminal device. Optionally, channel differential information of a complete channel (namely, a channel on which all channel components are combined) may be directly fed back without distinguishing spatial channel components.

The first part of antennas of the terminal device may be the first antenna or the last antenna of the terminal device, or may be the first two antennas or the last two antennas. This is not limited in this embodiment of this application. The first part of antennas of the terminal device may alternatively be antennas for sending uplink reference signals. The terminal device feeds back channel differential information between the channel information corresponding to the other antennas and the channel information corresponding to the first part of antennas. Alternatively, conversely, the terminal device feeds back the channel differential information between the channel information corresponding to the first part of antennas and the channel information corresponding to the other antennas.

With reference to the foregoing descriptions, in this embodiment of this application, K pieces of channel differential information corresponding to the identifiers of the K spatial channel components in the feedback information may be difference information between second channel information and third channel information.

The second channel information is channel information that is in the first channel information and that corresponds to the P antennas in the M antennas of the terminal device, the third channel information is channel information that is in the first channel information and that corresponds to M-P antennas in the M antennas, and the M-P antennas are antennas in the M antennas except the P antennas. The second channel information and the third channel information each are a spatial channel component, or may be a complete channel (namely, a channel on which all channel components are combined). A value of P may be indicated by the network device to the terminal device, for example, sent to the terminal device by using RRC signaling, MAC-CE information, or DCI, or may be reported by the terminal device, for example, reported to the network device by using a capability of the terminal device, or may be calculated according to a specific rule, for example, a value calculated based on a quantity of antennas/a quantity of antenna ports.

For example, it is assumed that there is only one spatial path, that is, there is only one spatial channel component. In this case, K is equal to 1. When the network device includes four antennas, and the terminal device includes four antennas, information included in the first channel information determined by the terminal device may be shown in Table 1.

In Table 1, $h_{i\text{-}j}$ represents channel information between an antenna i of the terminal device and an antenna j of the network device, where $1 \leq i \leq 4$, and $1 \leq j \leq 4$.

TABLE 1

| | Antenna 1 of the network device | Antenna 2 of the network device | Antenna 3 of the network device | Antenna 4 of the network device |
|---|---|---|---|---|
| Antenna 1 of the terminal device | $h_{1\text{-}1}$ | $h_{1\text{-}2}$ | $h_{1\text{-}3}$ | $h_{1\text{-}4}$ |
| Antenna 2 of the terminal device | $h_{2\text{-}1}$ | $h_{2\text{-}2}$ | $h_{2\text{-}3}$ | $h_{2\text{-}4}$ |
| Antenna 3 of the terminal device | $h_{3\text{-}1}$ | $h_{3\text{-}2}$ | $h_{3\text{-}3}$ | $h_{3\text{-}4}$ |
| Antenna 4 of the terminal device | $h_{4\text{-}1}$ | $h_{4\text{-}2}$ | $h_{4\text{-}3}$ | $h_{4\text{-}4}$ |

Assuming that the terminal device sends the uplink reference signal through the antenna 1, the network device may determine information in the first row in Table 1 by measuring the uplink reference signal, and information in the last three rows cannot be obtained through measurement. In this case, the terminal device may feed back difference information between the information in the first row and the information in the last three rows in Table 1.

With reference to Table 1, in this embodiment of this application, the channel differential information reported by the terminal device, namely, the difference information between the second channel information and the third channel information, may include one or more of the following:

difference information between $h_{1\text{-}1}$ and $h_{2\text{-}1}$, difference information between $h_{1\text{-}1}$ and $h_{3\text{-}1}$, and difference information between $h_{1\text{-}1}$ and $h_{4\text{-}1}$;

difference information between $h_{1\text{-}2}$ and $h_{2\text{-}2}$, difference information between $h_{1\text{-}2}$ and $h_{3\text{-}2}$, and difference information between $h_{1\text{-}2}$ and $h_{4\text{-}2}$;

difference information between $h_{1\text{-}3}$ and $h_{2\text{-}3}$, difference information between $h_{1\text{-}3}$ and $h_{3\text{-}3}$, and difference information between $h_{1\text{-}3}$ and $h_{4\text{-}3}$; and difference information between $h_{1\text{-}4}$ and $h_{2\text{-}4}$, difference information between $h_{1\text{-}4}$ and $h_{3\text{-}4}$, and difference information between $h_{1\text{-}4}$ and $h_{4\text{-}4}$.

It should be noted that the foregoing is merely an example. During actual application, the fed-back channel differential information may be determined based on an actual situation. For example, when the terminal device has four antennas, difference information between channel information corresponding to each of the second antenna, the third antenna, and the fourth antenna and channel information corresponding to the first antenna may be fed back.

The terminal device may alternatively perform differential feedback based on parity. For example, when the terminal device has eight antennas, the terminal device feeds back channel differential information between channel information of each of the third antenna, the fifth antenna, and the seventh antenna and channel information of the first antenna and channel differential information between channel information of each of the fourth antenna, the sixth antenna, and the eighth antenna and channel information of the second antenna. Whether to provide a feedback based on parity may be indicated by the network device to the terminal device, for example, sent to the terminal device by using RRC signaling, MAC-CE information, or DCI, or may be reported by the terminal device, for example, reported to the network device by using a capability of the terminal device, or may be a value calculated based on a quantity of antennas.

Alternatively, the terminal device may provide a differential feedback based on a polarization direction (for example, based on a polarization direction of an antenna of the terminal device). For example, when the terminal device has eight antennas, antennas corresponding to the first polarization direction are an antenna 1, an antenna 2, an antenna 3, and an antenna 4, and antennas corresponding to the second polarization direction are an antenna 5, an antenna 6, an antenna 7, and an antenna 8. In this case, the terminal device may feed back channel differential information between channel information of each of the antenna 2, the antenna 3, and the antenna 4 and channel information of the antenna 1 and channel differential information between channel information of each of the antenna 6, the antenna 7, and the antenna 8 and channel information of the antenna 5. Whether to provide a feedback based on a polarization direction may be indicated by the network device to the terminal device, for example, sent to the terminal device by using RRC signaling, MAC-CE information, or DCI, or may be reported by the terminal device, for example, reported to the network device by using a capability of the terminal device, or may be a value calculated based on a quantity of antennas.

In a protocol, a plurality of feedback manners may also be supported. A specific feedback manner to be used may be indicated by the network device to the terminal device, for example, sent to the terminal device by using RRC signaling, MAC-CE information, or DCI, or may be reported by the terminal device, for example, reported to the network device by using a capability of the terminal device, or may be a value calculated based on a quantity of antennas.

An antenna of each network device corresponds to one set of channel differential information. The terminal device may feed back only channel differential information corresponding to one antenna of the network device, for example, channel differential information corresponding to the first antenna of the network device. The terminal device may alternatively feed back channel differential information corresponding to a part of antennas of the network devices, for example, channel differential information corresponding to two antennas of the foregoing network device. Alternatively, all antennas of the network device are grouped, one or two antennas are selected from each group, and channel differential information corresponding to the one or two antennas is fed back. A quantity of groups or a size of a group (a quantity of included antennas) may be specified in a protocol by default, or may be indicated by the network device to the terminal device, for example, sent to the terminal device by using RRC signaling, MAC-CE information, or DCI, or may be reported by the terminal device, for example, reported to the network device by using a capability of the terminal device, or may be a value calculated based on a quantity of antennas. A value of the quantity of groups or the size of the group may be one or more of 1, 2, 4, 6, 8, 12, 16, 32, or 64, that is, a value range of the quantity of groups or the size of the group may be {1, 2, 4, 6, 8, 12, 16, 32, 64} or a subset thereof.

Alternatively, the terminal device may provide a feedback based on a polarization direction (for example, based on a polarization direction of an antenna of the terminal device). For example, for two polarization directions, channel differential information corresponding to one antenna of the network device in each polarization direction, for example, channel differential information corresponding to the first antenna (for example, an antenna with a smallest antenna index) of the network device corresponding to each polarization direction, is fed back. The terminal device may alternatively feed back channel differential information corresponding to all antennas of the network device. Whether to provide a feedback based on a polarization direction may be indicated by the network device to the terminal device, for example, sent to the terminal device by using RRC signaling, MAC-CE information, or DCI, or may be reported by the terminal device, for example, reported to the network device by using a capability of the terminal device, or may be a value calculated based on a quantity of antennas.

Further, in this embodiment of this application, channel information between two antennas may include one or a combination of more of a signal amplitude, a signal phase, and a signal delay. It is assumed that a first antenna is any one of the P antennas, and a second antenna is any one of the M-P antennas. Channel differential information between channel information corresponding to the first antenna and channel information corresponding to the second antenna may include one or more of the following:

an amplitude ratio or an amplitude difference, indicating a ratio or a difference between a signal amplitude in the channel information corresponding to the first antenna and a signal amplitude in the channel information corresponding to the second antenna;

a phase difference, indicating a difference between a signal phase in the channel information corresponding to the first antenna and a signal phase in the channel information corresponding to the second antenna; and a delay difference, indicating a difference between a signal delay in the channel information corresponding to the first antenna and a signal delay in the channel information corresponding to the second antenna.

For example, it is assumed that there is only one spatial path, that is, there is only one spatial channel component. In this case, K is equal to 1. When the network device includes four antennas, the terminal device includes four antennas, and channel information between two antennas includes a signal amplitude and a signal phase, information included in the first channel information determined by the terminal device may be shown in Table 2.

TABLE 2

| | Antenna 1 of the network device | | Antenna 2 of the network device | | Antenna 3 of the network device | | Antenna 4 of the network device | |
|---|---|---|---|---|---|---|---|---|
| | Signal amplitude | Signal phase | Signal amplitude | Signal phase | Signal amplitude | Signal phase | Signal amplitude | Signal phase |
| Antenna 1 of the terminal device | 1.04 | −1.56 | 1.03 | −2.15 | 1.04 | −2.72 | 1.05 | −3.02 |
| Antenna 2 of the terminal device | 0.97 | 1.55 | 0.95 | 1.05 | 0.96 | 0.49 | 0.97 | 0.09 |

TABLE 2-continued

|  | Antenna 1 of the network device | | Antenna 2 of the network device | | Antenna 3 of the network device | | Antenna 4 of the network device | |
| --- | --- | --- | --- | --- | --- | --- | --- | --- |
|  | Signal amplitude | Signal phase | Signal amplitude | Signal phase | Signal amplitude | Signal phase | Signal amplitude | Signal phase |
| Antenna 3 of the terminal device | 1.04 | 1.56 | 1.04 | 1.02 | 1.05 | 0.44 | 1.06 | 0.10 |
| Antenna 4 of the terminal device | 0.97 | −1.61 | 0.96 | −2.08 | 0.96 | −2.64 | 0.97 | −3.07 |

With reference to Table 1, it can be learned from Table 2 that the channel information $h_{1\text{-}1}$ between the antenna 1 of the terminal device and the antenna 1 of the network device includes the signal amplitude 1.04 and the signal phase −1.56;

the channel information $h_{2\text{-}1}$ between the antenna 2 of the terminal device and the antenna 1 of the network device includes the signal amplitude 0.97 and the signal phase 1.62;

the channel information $h_{3\text{-}1}$ between the antenna 3 of the terminal device and the antenna 1 of the network device includes the signal amplitude 1.04 and the signal phase 1.60; and the channel information $h_{4\text{-}1}$ between the antenna 4 of the terminal device and the antenna 1 of the network device includes the signal amplitude 0.97 and the signal phase −1.61.

The last three rows in Table 1 correspond to the last three rows in Table 2. Details are not described again.

Therefore, in the foregoing example, the channel differential information fed back by the terminal device may include: difference information between $h_{1\text{-}1}$ and $h_{2\text{-}1}$, difference information between $h_{1\text{-}1}$ and $h_{3\text{-}1}$, and difference information between $h_{1\text{-}1}$ and $h_{4\text{-}1}$. Specifically, the information may be information shown in Table 3 or Table 4.

TABLE 3

| Amplitude ratio | Phase difference |
| --- | --- |
| 0.93 | −3.11 |
| 1 | −3.12 |
| 0.93 | 0.05 |

In Table 3, the difference information between $h_{1\text{-}1}$ and $h_{2\text{-}1}$ includes: the amplitude ratio 0.93 between the signal amplitude in $h_{1\text{-}1}$ and the signal amplitude in $h_{2\text{-}1}$, and the phase difference −3.11 between the signal phase in $h_{1\text{-}1}$ and the signal phase in $h_{2\text{-}1}$; the difference information between $h_{1\text{-}1}$ and $h_{3\text{-}1}$ includes: the amplitude ratio 1 between the signal amplitude in $h_{1\text{-}1}$ and the signal amplitude in $h_{3\text{-}1}$, and the phase difference −3.12 between the signal phase in $h_{1\text{-}1}$ and the signal phase in $h_{3\text{-}1}$; and the difference information between $h_{1\text{-}1}$ and $h_{4\text{-}1}$ includes: the amplitude ratio 0.93 between the signal amplitude in $h_{1\text{-}1}$ and the signal amplitude in $h_{4\text{-}1}$, and the phase difference 0.05 between the signal phase in $h_{1\text{-}1}$ and the signal phase in $h_{4\text{-}1}$.

TABLE 4

| Amplitude difference | Phase difference |
| --- | --- |
| 0.07 | −3.11 |
| 0 | −3.12 |
| 0.07 | 0.05 |

In Table 4, the difference information between $h_{1\text{-}1}$ and $h_{2\text{-}1}$ includes: the amplitude difference 0.07 between the signal amplitude in $h_{1\text{-}1}$ and the signal amplitude in $h_{2\text{-}1}$, and the phase difference −3.11 between the signal phase in $h_{1\text{-}1}$ and the signal phase in $h_{2\text{-}1}$; the difference information between $h_{1\text{-}1}$ and $h_{3\text{-}1}$ includes: the amplitude difference 0 between the signal amplitude in $h_{1\text{-}1}$ and the signal amplitude in $h_{3\text{-}1}$, and the phase difference −3.12 between the signal phase in $h_{1\text{-}1}$ and the signal phase in $h_{3\text{-}1}$; and the difference information between $h_{1\text{-}1}$ and $h_{4\text{-}1}$ includes: the amplitude difference 0.07 between the signal amplitude in $h_{1\text{-}1}$ and the signal amplitude in $h_{4\text{-}1}$, and the phase difference 0.05 between the signal phase in $h_{1\text{-}1}$ and the signal phase in $h_{4\text{-}1}$.

It should be noted that when the channel differential information fed back by the terminal device is the information shown in Table 3 or Table 4, the network device may determine, based on the information shown in Table 3 or Table 4, the channel information between the antenna 1 of the network device and each of the antenna 2, the antenna 3, and the antenna 4 of the terminal device, that is, determine $h_{2\text{-}1}$, $h_{3\text{-}1}$, and $h_{4\text{-}1}$.

Correspondingly, if the terminal device does not feed back difference information between $h_{1\text{-}2}$ and each of $h_{2\text{-}2}$, $h_{3\text{-}2}$, and $h_{4\text{-}2}$, the network device may use difference information between $h_{1\text{-}1}$ and each of $h_{2\text{-}1}$, $h_{3\text{-}1}$, and $h_{4\text{-}1}$ as the difference information between $h_{1\text{-}2}$ and each of $h_{2\text{-}2}$, $h_{3\text{-}2}$, and $h_{4\text{-}2}$, to determine $h_{2\text{-}2}$, $h_{3\text{-}2}$, and $h_{4\text{-}2}$.

Similarly, the network device may use the difference information between $h_{1\text{-}1}$ and each of $h_{2\text{-}1}$, $h_{3\text{-}1}$, and $h_{4\text{-}1}$ as difference information between $h_{1\text{-}3}$ and each of $h_{2\text{-}3}$, $h_{3\text{-}3}$, and $h_{4\text{-}3}$, to determine $h_{2\text{-}3}$, $h_{3\text{-}3}$, and $h_{4\text{-}3}$. The network device may use the difference information between $h_{1\text{-}1}$ and each of $h_{2\text{-}1}$, $h_{3\text{-}1}$, and $h_{4\text{-}1}$ as difference information between $h_{1\text{-}4}$ and each of $h_{2\text{-}4}$, $h_{3\text{-}4}$, and $h_{4\text{-}4}$, to determine $h_{2\text{-}4}$, $h_{3\text{-}4}$, and $h_{4\text{-}4}$.

A quantization range of the amplitude difference/amplitude ratio may be 0 to x, where x may be any value in a set {0.5, 1, 1.5, 2, 2.5, 3}, and x may alternatively be another value. A quantization step is x/y, where y is a quantity of different values that may be fed back, y may be any one in a set {2, 4, 8, 16, 32, 64, 128, 256, 512, 1024, 2048, 4096, 8092} or any one thereof minus z, and z may be 1, 2, 3, or 4, or may be another integer.

A quantization range of the phase difference may be 0 to p, where p may be π, or π/m, and m may be one of 1, 2, 3, or 4. Alternatively, the quantization range may be the foregoing range minus or plus an offset, for example, may be the foregoing entire range minus π/n, where n may be one in a set {1, 2, 3, 4}. A quantization step is p/y, where y is a quantity of different values that may be fed back, y may be any one in the set {2, 4, 8, 16, 32, 64, 128, 256, 512, 1024, 2048, 4096, 8092} or any one thereof minus z, and z may be 1, 2, 3, or 4, or may be another integer.

In a possible implementation, when the channel differential information includes the amplitude ratio, the feedback information may further include amplitude flipping indication information corresponding to the amplitude ratio. When the amplitude ratio determined by the terminal device exceeds a quantization range, a quantization error is relatively large. Therefore, the terminal device may feed back a reciprocal of the amplitude ratio, so that the fed-back amplitude ratio is always within the quantization range. For example, the quantization range of the amplitude ratio is 0 to 1. When the amplitude ratio calculated by the terminal device is 2, the reciprocal 0.5 of the amplitude ratio is fed back, so that the fed-back amplitude ratio does not exceed the quantization range.

In this embodiment of this application, when the amplitude flipping indication information is a first state value, the amplitude flipping indication information is used to indicate that the amplitude ratio is the ratio between the signal amplitude in the channel information corresponding to the first antenna and the signal amplitude in the channel information corresponding to the second antenna; or when the amplitude flipping indication information is a second state value, the amplitude flipping indication information is used to indicate that the amplitude ratio is a reciprocal of the ratio between the signal amplitude in the channel information corresponding to the first antenna and the signal amplitude in the channel information corresponding to the second antenna.

For example, the amplitude flipping indication information includes one bit, used to indicate whether flipping occurs. For example, when a value of the amplitude flipping indication information is 0, it indicates that flipping does not occur. In this case, the terminal device feeds back an original value of the amplitude ratio. When the value of the amplitude flipping indication information is 1, it indicates that flipping occurs, and a fed-back amplitude ratio is a reciprocal of the original value. Alternatively, conversely, when a value of the amplitude flipping indication information is 1, it indicates that flipping does not occur. In this case, the terminal device feeds back an original value of the amplitude ratio. When the value of the amplitude flipping indication information is 0, it indicates that flipping occurs, and a fed-back amplitude ratio is a reciprocal of the original value. For each amplitude ratio, the terminal device may feed back one piece of corresponding amplitude flipping indication information.

In this embodiment of this application, the feedback information may further include other information. In a possible implementation, the feedback information may further include one or both of the following: a spatial channel component quantity, indicating a quantity of spatial channel components corresponding to the feedback information reported by the terminal device; and a time offset between the terminal device and the network device.

There may be a plurality of spatial paths, in a channel between the terminal device and the network device, corresponding to a plurality of spatial channel components. However, signal energy on most spatial channel components is quite weak, and corresponding channel differential information may not need to be fed back for these spatial channel components. Therefore, the terminal device may first determine specific channel differential information, corresponding to spatial channel components or spatial paths, that needs to be fed back.

The spatial channel component quantity of the channel differential information that needs to be fed back may be specified in a protocol by default, or may be indicated by the network device to the terminal device. For example, the network device sends the spatial channel component quantity to the terminal device by using RRC signaling, MAC-CE information, or DCI.

Optionally, the spatial channel component quantity may alternatively be a value determined by the terminal device, and the terminal device reports the spatial channel component quantity to the network device. Alternatively, the spatial channel component quantity may be dynamically calculated by the terminal device, and the spatial channel component quantity reported by the terminal device each time may be different. If the spatial channel component quantity is dynamically determined by the terminal device, the terminal device needs to report the spatial channel component quantity to the network device, so that the network device can determine a quantity, of spatial channel components corresponding to the channel differential information, that is reported by the terminal device. For example, in the reporting format, a field is used to indicate the reported spatial channel component quantity. The spatial channel component quantity may also be reported by the terminal device to the network device by using a terminal capability reporting process.

Time of the terminal device may not be completely aligned with time of the network device. Consequently, an $i^{th}$ spatial channel component fed back by the terminal device may be determined by the network device as an $(i+k)^{th}$ spatial channel component, where k is the time offset. To ensure that the network device correctly determines each fed-back spatial channel component, the terminal device may feed back the time offset between the terminal device and the network device to the network device.

For example, the terminal device may feed back absolute time, or may feed back an integer value k, indicating k time units. The time unit may be specifically a sampling time interval, for example, Ts, where Ts=1/N/SCS, N is a quantity of sampling points and may be any one of 1128, 256, 512, 1024, 2048, 4096, 8092), and the SCS (subcarrier spacing) is a used subcarrier spacing and may be any one of {15000, 30000, 60000, 120000, 240000}. Alternatively, the terminal device may feed back an identifier, a delay, sampling time, or a sampling point identifier of the first spatial channel component corresponding to an antenna used to send the uplink reference signal, so that the network device calculates the time offset between the network device and the terminal device. The time offset may be fed back for each spatial channel component; or may be fed back for only one spatial channel component, and is used for all spatial channel components. This is not limited in this embodiment of this application.

The foregoing measurement method may be used to measure a current cell, may be used to perform inter-cell measurement, that is, measure quality of another cell, or may be used to perform inter-frequency measurement, that is, measure another channel/frequency/frequency.

Step 306: The network device receives the feedback information from the terminal device, and determines fifth channel information between the network device and the terminal device based on the fourth channel information and the feedback information.

The fifth channel information determined by the network device is channel information between all antennas of the network device and all antennas of the terminal device, and is complete channel information between the network device and the terminal device.

How the network device specifically determines the fifth channel information based on the fourth channel information With reference to the foregoing descriptions, the following describes the foregoing process by using specific embodiments. For ease of description, the channel information between the antenna i of the terminal device and the antenna j of the network device is denoted as $h_{i\text{-}j}$ below.

For example, it is assumed that K is equal to 1, to be specific, the channel between the network device and the terminal device includes one spatial path or spatial channel component, the terminal device includes four antennas, and the network device includes four antennas. The fourth channel information obtained by the network device by measuring the uplink reference signal sent by the terminal device through the antenna 1 includes information between the antenna 1 of the terminal device and each of the antenna 1, the antenna 2, the antenna 3, and the antenna 4 of the network device, that is, includes $h_{1\text{-}1}$, $h_{1\text{-}2}$, $h_{1\text{-}3}$, and $h_{1\text{-}4}$. For example, the information may be shown in Table 5.

TABLE 5

|  | Antenna 1 of the network device | | Antenna 2 of the network device | | Antenna 3 of the network device | | Antenna 4 of the network device | |
| --- | --- | --- | --- | --- | --- | --- | --- | --- |
|  | Signal amplitude | Signal phase | Signal amplitude | Signal phase | Signal amplitude | Signal phase | Signal amplitude | Signal phase |
| Antenna 1 of the terminal device | 1.10 | −1.55 | 1.05 | −2.15 | 1.08 | −2.72 | 1.05 | 3.02 | and the feedback information is not limited in this embodiment of this application. Details are not described herein again.

According to the method provided in this embodiment, the network device can obtain accurate channel information with low measurement reporting overheads, so that uplink and downlink data transmission performance is improved.

It should be noted that, after determining the fifth channel information, the network device may calculate an optimal rank indicator (RI) and an optimal precoding matrix indicator (PMI) based on the fifth channel information. The RI is an identifier of a rank of a channel matrix, and is used to indicate a quantity of data streams that can be supported by a channel. For example, when the RI is 2, it indicates that a downlink channel of the terminal device supports 2-stream transmission. The PMI is an identifier of a precoding matrix. A plurality of precoding matrices (or referred to as codebooks) are specified in a protocol. The network device may select an optimal precoding matrix based on the fifth channel information, and perform downlink data transmission based on the precoding matrix.

Further, the first channel information obtained by the terminal device by measuring downlink reference signals sent by the network device through all antennas may be shown in the foregoing Table 2.

The feedback information determined by the terminal device may include the difference information between $h_{1\text{-}1}$ and $h_{2\text{-}1}$, the difference information between $h_{1\text{-}1}$ and $h_{3\text{-}1}$, and the difference information between $h_{1\text{-}1}$ and $h_{4\text{-}1}$. Specifically, the information may be information shown in Table 4.

After obtaining the feedback information, the network device may determine $h_{2\text{-}1}$, $h_{3\text{-}1}$, and $h_{4\text{-}1}$ based on the feedback information.

The network device may further use the feedback information as the difference information between $h_{1\text{-}2}$ and each of $h_{2\text{-}2}$, $h_{3\text{-}2}$, and $h_{4\text{-}2}$, to determine $h_{2\text{-}2}$, $h_{3\text{-}2}$, and $h_{4\text{-}2}$; use the feedback information as the difference information between $h_{1\text{-}3}$ and each of $h_{2\text{-}3}$, $h_{3\text{-}3}$, and $h_{4\text{-}3}$, to determine $h_{2\text{-}3}$, $h_{3\text{-}3}$, and $h_{4\text{-}3}$; and use the feedback information as the difference information between $h_{1\text{-}4}$ and each of $h_{2\text{-}4}$, $h_{3\text{-}4}$, and $h_{4\text{-}4}$, to determine $h_{2\text{-}4}$, $h_{3\text{-}4}$, and $h_{4\text{-}4}$.

Finally, the fifth channel information determined by the network device based on the fourth channel information and the feedback information may be shown in Table 6.

TABLE 6

|  | Antenna 1 of the network device | | Antenna 2 of the network device | | Antenna 3 of the network device | | Antenna 4 of the network device | |
| --- | --- | --- | --- | --- | --- | --- | --- | --- |
|  | Signal amplitude | Signal phase | Signal amplitude | Signal phase | Signal amplitude | Signal phase | Signal amplitude | Signal phase |
| Antenna 1 of the terminal device | 1.10 | −1.55 | 1.05 | −2.10 | 1.08 | −2.72 | 1.05 | −3.02 |
| Antenna 2 of the terminal device | 1.03 | 1.56 | 0.98 | 1.01 | 1.01 | 0.39 | 0.98 | 0.09 |

TABLE 6-continued

|  | Antenna 1 of the network device | | Antenna 2 of the network device | | Antenna 3 of the network device | | Antenna 4 of the network device | |
| --- | --- | --- | --- | --- | --- | --- | --- | --- |
|  | Signal amplitude | Signal phase | Signal amplitude | Signal phase | Signal amplitude | Signal phase | Signal amplitude | Signal phase |
| Antenna 3 of the terminal device | 1.10 | 1.57 | 1.05 | 1.02 | 1.08 | 0.40 | 1.05 | 0.10 |
| Antenna 4 of the terminal device | 1.03 | −1.60 | 0.98 | −2.15 | 1.01 | −2.77 | 0.98 | −3.07 |

The foregoing descriptions are merely an example, and another case is not described again.

Embodiments described in this specification may be independent solutions, or may be combined based on internal logic. These solutions all fall within the protection scope of this application.

It may be understood that, in the foregoing method embodiments, the methods and the operations implemented by the terminal device may alternatively be implemented by a component (for example, a chip or a circuit) that can be used in the terminal device, and the methods and the operations implemented by the network device may alternatively be implemented by a component (for example, a chip or a circuit) that can be used in the network device.

In the foregoing embodiments provided in this application, the method provided in embodiments of this application is separately described from a perspective of interaction between devices. To implement functions in the foregoing methods provided in embodiments of this application, the terminal device and the network device may include a hardware structure and/or a software module, and implement the foregoing functions in a form of the hardware structure, the software module, or a combination of the hardware structure and the software module. Whether a specific function in the foregoing functions is performed by using a hardware structure, a software module, or a combination of the hardware structure and the software module depends on a specific application and a design constraint of the technical solutions.

In embodiments of this application, division into the modules is an example, and is merely logical function division. There may be another division manner during actual implementation. In addition, functional modules in embodiments of this application may be integrated into one processor, or each of the modules may exist alone physically, or two or more modules are integrated into one module. The integrated module may be implemented in a form of hardware, or may be implemented in a form of a software functional module.

Figure 5:
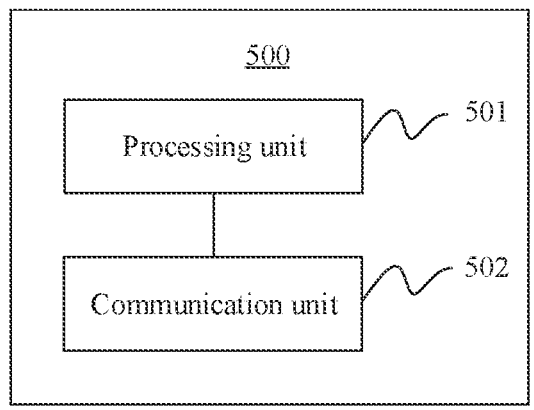
FIG. 5 is a schematic diagram of a structure of a communication apparatus according to an embodiment of this application.

Same as the foregoing concept, as shown in FIG. 5, an embodiment of this application further provides an apparatus 500, configured to implement a function of the terminal device or the network device in the foregoing method. For example, the apparatus may be a software module or a chip system. In this embodiment of this application, the chip system may include a chip, or may include a chip and another discrete component. The apparatus 500 may include a processing unit 501 and a communication unit 502.

In this embodiment of this application, the communication unit may also be referred to as a transceiver unit, and may include a sending unit and/or a receiving unit, which are respectively configured to perform sending and receiving steps of the terminal device or the network device in the foregoing method embodiments.

Figure 6:
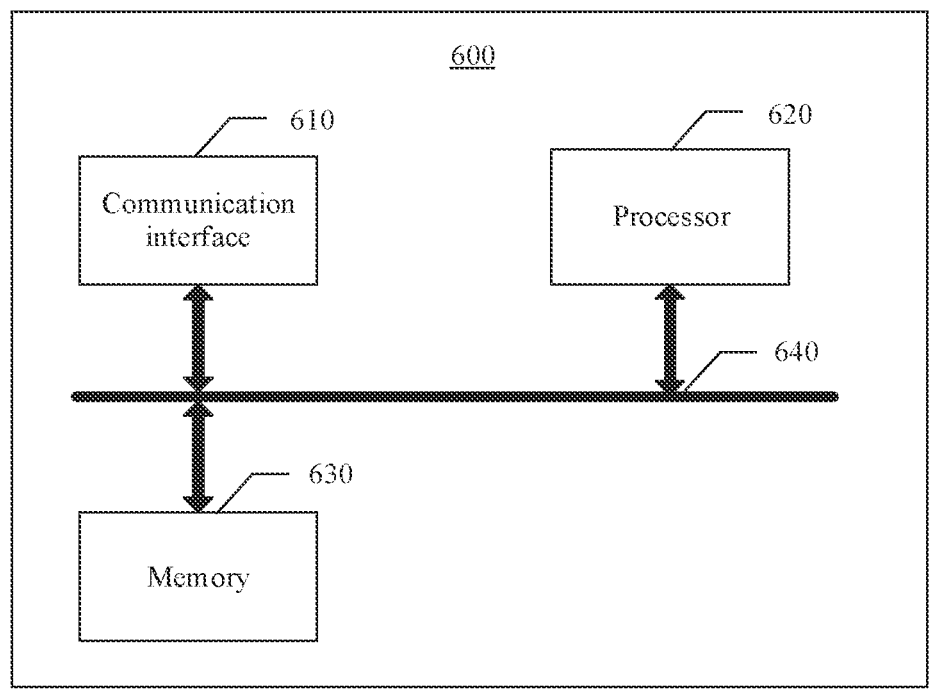
FIG. 6 is a schematic diagram of a structure of a communication apparatus according to an embodiment of this application.

The following describes in detail communication apparatuses provided in embodiments of this application with reference to FIG. 5 and FIG. 6. It should be understood that descriptions of the apparatus embodiments correspond to the descriptions of the method embodiments. Therefore, for content not described in detail, refer to the foregoing method embodiments. For brevity, details are not described herein again.

In a possible design, the apparatus 500 may implement steps or procedures corresponding to the terminal device or the network device in the foregoing method embodiments. Descriptions are separately provided below For example, when the apparatus 500 implements the function of the terminal device in the procedure shown in FIG. 3, the processing unit 501 is configured to: determine first channel information between a terminal device and a network device based on a downlink reference signal from the network device, and determine feedback information based on the first channel information; and the communication unit 502 is configured to send the feedback information to the network device, where the feedback information includes identifiers of K spatial channel components and channel differential information corresponding to each of the identifiers of the K spatial channel components, and K is an integer greater than or equal to 1; and K pieces of channel differential information corresponding to the identifiers of the K spatial channel components are difference information between second channel information and third channel information, the second channel information is channel information that is in the first channel information and that corresponds to P antennas in M antennas of the terminal device, the third channel information is channel information that is in the first channel information and that corresponds to M-P antennas in the M antennas, the M-P antennas are antennas in the M antennas except the P antennas. M is an integer greater than P, and P is an integer greater than 0.

In the foregoing method, the terminal device does not need to feed back complete channel information, and may feed back the difference information with low measurement and reporting overheads, so that the network device obtains the complete channel information. This improves uplink and downlink data transmission performance.

In a possible implementation, the channel differential information corresponding to each of the identifiers of the K spatial channel components is channel differential information between channel information corresponding to at least one of the P antennas and channel information corresponding to at least one of the M-P antennas.

In a possible implementation, channel differential information between channel information corresponding to a first antenna and channel information corresponding to a second antenna includes one or more of the following: an amplitude ratio or an amplitude difference, indicating a ratio or a difference between a signal amplitude in the channel information corresponding to the first antenna and a signal amplitude in the channel information corresponding to the second antenna;
  a phase difference, indicating a difference between a signal phase in the channel information corresponding to the first antenna and a signal phase in the channel information corresponding to the second antenna; and a delay difference, indicating a difference between a signal delay in the channel information corresponding to the first antenna and a signal delay in the channel information corresponding to the second antenna, where the first antenna is any one of the P antennas, and the second antenna is any one of the M-P antennas.

In a possible implementation, when the channel differential information includes the amplitude ratio, the feedback information further includes amplitude flipping indication information corresponding to the amplitude ratio; and when the amplitude flipping indication information is a first state value, the amplitude flipping indication information is used to indicate that the amplitude ratio is the ratio between the signal amplitude in the channel information corresponding to the first antenna and the signal amplitude in the channel information corresponding to the second antenna, or when the amplitude flipping indication information is a second state value, the amplitude flipping indication information is used to indicate that the amplitude ratio is a reciprocal of the ratio between the signal amplitude in the channel information corresponding to the first antenna and the signal amplitude in the channel information corresponding to the second antenna.

In a possible implementation, the feedback information further includes one or both of the following: a spatial channel component quantity, indicating a quantity of spatial channel components corresponding to the feedback information reported by the terminal device; and a time offset between the terminal device and the network device.

For example, when the apparatus 500 implements the function of the terminal device in the procedure shown in FIG. 3,
  the communication unit 502 is configured to: measure uplink reference signals from P antennas of a terminal device, to obtain fourth channel information, where the fourth channel information is channel information corresponding to the P antennas, and P is an integer greater than 0; and receive feedback information from the terminal device; and
  the processing unit 501 is configured to determine fifth channel information between the network device and the terminal device based on the fourth channel information and the feedback information, where
  the feedback information includes identifiers of K spatial channel components and channel differential information corresponding to each of the identifiers of the K spatial channel components, and K is an integer greater than or equal to 1; and
  K pieces of channel differential information corresponding to the identifiers of the K spatial channel components are difference information between second channel information and third channel information, the second channel information is channel information that is in first channel information and that corresponds to the P antennas in M antennas of the terminal device, the third channel information is channel information that is in the first channel information and that corresponds to M-P antennas in the M antennas, the first channel information is channel information between all antennas of the terminal device and all antennas of the network device, the M-P antennas are antennas in the M antennas except the P antennas, and M is an integer greater than P.

In the foregoing method, when the terminal device sends the uplink reference signal through a part of antennas, the network device may determine complete channel information of a channel between the network device and the terminal device by using the fed-back difference information in the feedback information that is sent by the terminal device. This improves uplink and downlink data transmission performance.

In a possible implementation, the channel differential information corresponding to each of the identifiers of the K spatial channel components is channel differential information between channel information corresponding to at least one of the P antennas and channel information corresponding to at least one of the M-P antennas.

In a possible implementation, channel differential information between channel information corresponding to a first antenna and channel information corresponding to a second antenna includes one or more of the following:
  an amplitude ratio or an amplitude difference, indicating a ratio or a difference between a signal amplitude in the channel information corresponding to the first antenna and a signal amplitude in the channel information corresponding to the second antenna;
  a phase difference, indicating a difference between a signal phase in the channel information corresponding to the first antenna and a signal phase in the channel information corresponding to the second antenna; and
  a delay difference, indicating a difference between a signal delay in the channel information corresponding to the first antenna and a signal delay in the channel information corresponding to the second antenna, where
  the first antenna is any one of the P antennas, and the second antenna is any one of the M-P antennas.

In a possible implementation, when the channel differential information includes the amplitude ratio, the feedback information further includes amplitude flipping indication information corresponding to the amplitude ratio; and
  when the amplitude flipping indication information is a first state value, the amplitude flipping indication information is used to indicate that the amplitude ratio is the ratio between the signal amplitude in the channel information corresponding to the first antenna and the signal amplitude in the channel information corresponding to the second antenna; or
  when the amplitude flipping indication information is a second state value, the amplitude flipping indication information is used to indicate that the amplitude ratio is a reciprocal of the ratio between the signal amplitude in the channel information corresponding to the first antenna and the signal amplitude in the channel information corresponding to the second antenna.

In a possible implementation, the feedback information further includes one or both of the following:
  a spatial channel component quantity, indicating a quantity of spatial channel components corresponding to the feedback information reported by the terminal device; and
  a time offset between the terminal device and the network device.

FIG. 6 shows an apparatus 600 according to an embodiment of this application. The apparatus shown in FIG. 6 may be an implementation of a hardware circuit of the apparatus shown in FIG. 5. The communication apparatus is applicable to the flowchart shown in FIG. 3, and performs a function of the terminal device or the network device in the foregoing method embodiments. For ease of description, FIG. 6 shows only main components of the communication apparatus.

The apparatus 600 shown in FIG. 6 includes at least one processor 620, configured to implement any method in FIG. 3 provided in embodiments of this application.

The apparatus 600 may further include at least one memory 630, configured to store program instructions and/or data. The memory 630 is coupled to the processor 620. The coupling in this embodiment of this application may be an indirect coupling or a communication connection between apparatuses, units, or modules in an electrical form, a mechanical form, or another form, and is used for information exchange between the apparatuses, the units, or the modules. The processor 620 may cooperate with the memory 630. The processor 620 may execute the program instructions stored in the memory 630. At least one of the at least one memory may be included in the processor.

In an implementation process, the steps in the foregoing methods may be implemented by using a hardware integrated logic circuit in the processor, or by using instructions in a form of software. The steps of the methods disclosed with reference to embodiments of this application may be performed by a hardware processor, or may be performed by using a combination of hardware and software modules in the processor. The software module may be located in a mature storage medium in the art, such as a random access memory (RAM), a flash memory, a read-only memory (ROM), a programmable read-only memory (PROM), an electrically erasable programmable memory, or a register. The storage medium is located in the memory, and the processor reads information in the memory and completes the steps in the foregoing methods in combination with hardware in the processor. To avoid repetition, details are not described herein again.

It should be noted that the processor in embodiments of this application may be an integrated circuit chip, and has a signal processing capability. In an implementation process, the steps in the foregoing method embodiments may be implemented by using a hardware integrated logic circuit in the processor, or by using instructions in a form of software. The foregoing processor may be a general-purpose processor, a digital signal processor (DSP), an application-specific integrated circuit (ASIC), a field programmable gate array (FPGA) or another programmable logic device, a discrete gate or transistor logic device, or a discrete hardware component. The processor may implement or perform the methods, steps, and logical block diagrams that are disclosed in embodiments of this application. The general-purpose processor may be a microprocessor, or the processor may be any conventional processor or the like. The steps of the methods disclosed with reference to embodiments of this application may be performed by a hardware decoding processor, or may be performed by using a combination of hardware and software modules in the decoding processor. The software module may be located in a mature storage medium in the art, such as a RAM, a flash memory, a ROM, a PROM, an electrically erasable programmable memory, or a register. The storage medium is located in the memory, and the processor reads information in the memory and completes the steps in the foregoing methods in combination with hardware in the processor.

It may be understood that, in embodiments of this application, the memory may be a volatile memory or a nonvolatile memory, or may include both a volatile memory and a nonvolatile memory. The nonvolatile memory may be a ROM, a PROM, an erasable programmable read-only memory (EPROM), an electrically erasable programmable read-only memory (EEPROM), or a flash memory. The volatile memory may be a RAM, used as an external cache. Through example but not limitative descriptions, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct Rambus random access memory (DR RAM). It should be noted that the memories in the systems and method described in this specification include but are not limited to these memories and any memory of another proper type.

The apparatus 600 may further include a communication interface 610, configured to communicate with another device by using a transmission medium, so that an apparatus in the apparatus 600 may communicate with another device. In this embodiment of this application, the communication interface may be a transceiver, a circuit, a bus, a module, or a communication interface of another type. In this embodiment of this application, when the communication interface is a transceiver, the transceiver may include an independent receiver and an independent transmitter, or may be a transceiver integrated with a transceiver function or an interface circuit.

The apparatus 600 may further include a communication line 640. The communication interface 610, the processor 620, and the memory 630 may be connected to each other through the communication line 640. The communication line 640 may be a peripheral component interconnect (PCI) bus, an extended industry standard architecture (EISA) bus, or the like. The communication line 640 may be classified into an address bus, a data bus, a control bus, and the like. For ease of representation, only one thick line is used to represent the bus in FIG. 6, but this does not mean that there is only one bus or only one type of bus.

For example, when the apparatus 600 implements the function of the terminal device in the procedure shown in FIG. 3, the processor 620 is configured to: determine first channel information between a terminal device and a network device based on a downlink reference signal from the network device, and determine feedback information based on the first channel information; and the communication interface 610 is configured to send the feedback information to the network device, where the feedback information includes identifiers of the K spatial channel components and channel differential information corresponding to each of the identifiers of the K spatial channel components, and K is an integer greater than or equal to 1; and K pieces of channel differential information corresponding to the identifiers of the K spatial channel components are difference information between second channel information and third channel information, the second channel information is channel information that is in the first channel information and that corresponds to P antennas in M antennas of the terminal device, the third channel information is channel information that is in the first channel information and that corresponds to M-P antennas in the M antennas, the M-P antennas are antennas in the M antennas except the P antennas, M is an integer greater than P, and P is an integer greater than 0.

In the foregoing method, the terminal device does not need to feed back complete channel information, and may feed back the difference information with low measurement and reporting overheads, so that the network device obtains the complete channel information. This improves uplink and downlink data transmission performance.

In a possible implementation, the channel differential information corresponding to each of the identifiers of the K spatial channel components is channel differential information between channel information corresponding to at least one of the P antennas and channel information corresponding to at least one of the M-P antennas.

In a possible implementation, channel differential information between channel information corresponding to a first antenna and channel information corresponding to a second antenna includes one or more of the following: an amplitude ratio or an amplitude difference, indicating a ratio or a difference between a signal amplitude in the channel information corresponding to the first antenna and a signal amplitude in the channel information corresponding to the second antenna;
  a phase difference, indicating a difference between a signal phase in the channel information corresponding to the first antenna and a signal phase in the channel information corresponding to the second antenna; and a delay difference, indicating a difference between a signal delay in the channel information corresponding to the first antenna and a signal delay in the channel information corresponding to the second antenna, where the first antenna is any one of the P antennas, and the second antenna is any one of the M-P antennas.

In a possible implementation, when the channel differential information includes the amplitude ratio, the feedback information further includes amplitude flipping indication information corresponding to the amplitude ratio; and when the amplitude flipping indication information is a first state value, the amplitude flipping indication information is used to indicate that the amplitude ratio is the ratio between the signal amplitude in the channel information corresponding to the first antenna and the signal amplitude in the channel information corresponding to the second antenna; or when the amplitude flipping indication information is a second state value, the amplitude flipping indication information is used to indicate that the amplitude ratio is a reciprocal of the ratio between the signal amplitude in the channel information corresponding to the first antenna and the signal amplitude in the channel information corresponding to the second antenna.

In a possible implementation, the feedback information further includes one or both of the following: a spatial channel component quantity, indicating a quantity of spatial channel components corresponding to the feedback information reported by the terminal device, and a time offset between the terminal device and the network device.

For example, when the apparatus 600 implements the function of the terminal device in the procedure shown in FIG. 3,
  the communication interface 610 is configured to: measure uplink reference signals from P antennas of a terminal device, to obtain fourth channel information, where the fourth channel information is channel information corresponding to the P antennas, and P is an integer greater than 0; and receive feedback information from the terminal device; and the processor 620 is configured to determine fifth channel information between the network device and the terminal device based on the fourth channel information and the feedback information, where
the feedback information includes identifiers of K spatial channel components and channel differential information corresponding to each of the identifiers of the K spatial channel components, and K is an integer greater than or equal to 1; and
K pieces of channel differential information corresponding to the identifiers of the K spatial channel components are difference information between second channel information and third channel information, the second channel information is channel information that is in first channel information and that corresponds to the P antennas in M antennas of the terminal device, the third channel information is channel information that is in the first channel information and that corresponds to M-P antennas in the M antennas, the first channel information is channel information between all antennas of the terminal device and all antennas of the network device, the M-P antennas are antennas in the M antennas except the P antennas, and M is an integer greater than P.

In the foregoing method, when the terminal device sends the uplink reference signal through a part of antennas, the network device may determine complete channel information of a channel between the network device and the terminal device by using the fed-back difference information in the feedback information that is sent by the terminal device. This improves uplink and downlink data transmission performance.

In a possible implementation, the channel differential information corresponding to each of the identifiers of the K spatial channel components is channel differential information between channel information corresponding to at least one of the P antennas and channel information corresponding to at least one of the M-P antennas.

In a possible implementation, channel differential information between channel information corresponding to a first antenna and channel information corresponding to a second antenna includes one or more of the following:
  an amplitude ratio or an amplitude difference, indicating a ratio or a difference between a signal amplitude in the channel information corresponding to the first antenna and a signal amplitude in the channel information corresponding to the second antenna;
  a phase difference, indicating a difference between a signal phase in the channel information corresponding to the first antenna and a signal phase in the channel information corresponding to the second antenna; and
  a delay difference, indicating a difference between a signal delay in the channel information corresponding to the first antenna and a signal delay in the channel information corresponding to the second antenna, where
  the first antenna is any one of the P antennas, and the second antenna is any one of the M-P antennas.

In a possible implementation, when the channel differential information includes the amplitude ratio, the feedback information further includes amplitude flipping indication information corresponding to the amplitude ratio; and
  when the amplitude flipping indication information is a first state value, the amplitude flipping indication information is used to indicate that the amplitude ratio is the ratio between the signal amplitude in the channel information corresponding to the first antenna and the signal amplitude in the channel information corresponding to the second antenna; or when the amplitude flipping indication information is a second state value, the amplitude flipping indication information is used to indicate that the amplitude ratio is a reciprocal of the ratio between the signal amplitude in the channel information corresponding to the first antenna and the signal amplitude in the channel information corresponding to the second antenna.

In a possible implementation, the feedback information further includes one or both of the following:

a spatial channel component quantity, indicating a quantity of spatial channel components corresponding to the feedback information reported by the terminal device, and a time offset between the terminal device and the network device.

A person skilled in the art should understand that embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, an optical memory, and the like) that include compute-usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by a computer or a processor of another programmable data processing device generate an apparatus for implementing a specific function in one or more processes in the flowcharts and/or in one or more blocks in the block diagrams.

These computer program instructions may be stored in a computer-readable memory that can instruct the computer or another programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

It is clear that a person skilled in the art can make various modifications and variations to this application without departing from the scope of this application. This application is intended to cover these modifications and variations of this application provided that they fall within the scope of protection defined by the claims of this application and their equivalent technologies.

What is claimed is:

1. A channel information determining method, the channel information determining method comprising:

determining, by a terminal device, first channel information between the terminal device and a network device based on a downlink reference signal from the network device;

determining, by the terminal device, feedback information based on the first channel information; and sending, by the terminal device, the feedback information to the network device, wherein:

the feedback information comprises identifiers of K spatial channel components and channel differential information corresponding to each of the identifiers of the K spatial channel components, and K is an integer greater than or equal to 1; and K pieces of channel differential information corresponding to the identifiers of the K spatial channel components are difference information between second channel information and third channel information, wherein the second channel information is channel information that is in the first channel information and that corresponds to P antennas in M antennas of the terminal device, and wherein the third channel information is channel information that is in the first channel information and that corresponds to M-P antennas in the M antennas, the M-P antennas are antennas in the M antennas except the P antennas, M is an integer greater than P, and P is an integer greater than 0.

2. The channel information determining method according to claim 1, wherein the channel differential information corresponding to each of the identifiers of the K spatial channel components is channel differential information between channel information corresponding to at least one of the P antennas and channel information corresponding to at least one of the M-P antennas.

3. The channel information determining method according to claim 1, wherein channel differential information between channel information corresponding to a first antenna and channel information corresponding to a second antenna comprises one or more of the following:

an amplitude ratio or an amplitude difference, wherein the amplitude ratio or the amplitude difference indicates a ratio or a difference between a signal amplitude in the channel information corresponding to the first antenna and a signal amplitude in the channel information corresponding to the second antenna;

a phase difference, wherein the phase difference indicates a difference between a signal phase in the channel information corresponding to the first antenna and a signal phase in the channel information corresponding to the second antenna; or a delay difference, wherein the delay difference indicates a difference between a signal delay in the channel information corresponding to the first antenna and a signal delay in the channel information corresponding to the second antenna, wherein the first antenna is one of the P antennas, and the second antenna is one of the M-P antennas.

4. The channel information determining method according to claim 3, wherein:

when the channel differential information between the channel information corresponding to the first antenna and the channel information corresponding to the second antenna comprises the amplitude ratio, the feedback information further comprises amplitude flipping indication information corresponding to the amplitude ratio; and when the amplitude flipping indication information is a first state value, the amplitude flipping indication information indicates that the amplitude ratio is the ratio between the signal amplitude in the channel information corresponding to the first antenna and the signal amplitude in the channel information corresponding to the second antenna; or when the amplitude flipping indication information is a second state value, the amplitude flipping indication information indicates that the amplitude ratio is a reciprocal of the ratio between the signal amplitude in the channel information corresponding to the first antenna and the signal amplitude in the channel information corresponding to the second antenna.

5. The channel information determining method according to claim 1, wherein the feedback information further comprises one or both of the following:

a spatial channel component quantity, wherein the spatial channel component quantity indicates a quantity of spatial channel components corresponding to the feedback information reported by the terminal device; and a time offset between the terminal device and the network device.

6. A communication apparatus, the communicating apparatus comprising:

a transceiver;

at least one processor; and one or more memories coupled to the at least one processor and store program instructions for execution by the at least one processor to:

determine first channel information between a terminal device and a network device based on a downlink reference signal from the network device; and determine feedback information based on the first channel information; and wherein the transceiver is configured to send the feedback information to the network device, wherein:

the feedback information comprises identifiers of K spatial channel components and channel differential information corresponding to each of the identifiers of the K spatial channel components, and K is an integer greater than or equal to 1; and K pieces of channel differential information corresponding to the identifiers of the K spatial channel components are difference information between second channel information and third channel information, wherein the second channel information is channel information that is in the first channel information and that corresponds to P antennas in M antennas of the terminal device, and wherein the third channel information is channel information that is in the first channel information and that corresponds to M-P antennas in the M antennas, the M-P antennas are antennas in the M antennas except the P antennas, M is an integer greater than P, and P is an integer greater than 0.

7. The communication apparatus according to claim 6, wherein the channel differential information corresponding to each of the identifiers of the K spatial channel components is channel differential information between channel information corresponding to at least one of the P antennas and channel information corresponding to at least one of the M-P antennas.

8. The communication apparatus according to claim 6, wherein channel differential information between channel information corresponding to a first antenna and channel information corresponding to a second antenna comprises one or more of the following:

an amplitude ratio or an amplitude difference, wherein the amplitude ratio or the amplitude difference indicates a ratio or a difference between a signal amplitude in the channel information corresponding to the first antenna and a signal amplitude in the channel information corresponding to the second antenna;

a phase difference, wherein the phase difference indicates a difference between a signal phase in the channel information corresponding to the first antenna and a signal phase in the channel information corresponding to the second antenna; or a delay difference, wherein the delay difference indicates a difference between a signal delay in the channel information corresponding to the first antenna and a signal delay in the channel information corresponding to the second antenna, wherein the first antenna is any one of the P antennas, and the second antenna is any one of the M-P antennas.

9. The communication apparatus according to claim 8, wherein:

when the channel differential information between the channel information corresponding to the first antenna and the channel information corresponding to the second antenna comprises the amplitude ratio, the feedback information further comprises amplitude flipping indication information corresponding to the amplitude ratio; and when the amplitude flipping indication information is a first state value, the amplitude flipping indication information indicates that the amplitude ratio is the ratio between the signal amplitude in the channel information corresponding to the first antenna and the signal amplitude in the channel information corresponding to the second antenna; or when the amplitude flipping indication information is a second state value, the amplitude flipping indication information indicates that the amplitude ratio is a reciprocal of the ratio between the signal amplitude in the channel information corresponding to the first antenna and the signal amplitude in the channel information corresponding to the second antenna.

10. The communication apparatus according to claim 6, wherein the feedback information further comprises one or both of the following:

a spatial channel component quantity, wherein the spatial channel component quantity indicates a quantity of spatial channel components corresponding to the feedback information reported by the terminal device; and a time offset between the terminal device and the network device.

* * * * *